(12) United States Patent
Han

(10) Patent No.: US 11,364,631 B2
(45) Date of Patent: Jun. 21, 2022

(54) METHOD OF OPERATING MOBILE ROBOT

(71) Applicant: LG ELECTRONICS INC., Seoul (KR)

(72) Inventor: Hyemin Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 218 days.

(21) Appl. No.: 16/627,537

(22) PCT Filed: Jun. 28, 2018

(86) PCT No.: PCT/KR2018/007345
§ 371 (c)(1),
(2) Date: Dec. 30, 2019

(87) PCT Pub. No.: WO2019/004746
PCT Pub. Date: Jan. 3, 2019

(65) Prior Publication Data
US 2020/0164515 A1  May 28, 2020

(30) Foreign Application Priority Data

Jun. 30, 2017  (KR) .................. 10-2017-0083627

(51) Int. Cl.
B25J 9/16   (2006.01)
B25J 11/00  (2006.01)
B25J 13/08  (2006.01)

(52) U.S. Cl.
CPC .......... *B25J 9/1666* (2013.01); *B25J 9/1697* (2013.01); *B25J 11/008* (2013.01); *B25J 13/086* (2013.01); *B25J 13/089* (2013.01)

(58) Field of Classification Search
CPC ...... B25J 9/1666; B25J 9/1697; B25J 11/008; B25J 13/089; B25J 13/086; G05D 1/00; G05D 1/0289; Y10S 901/01
USPC ................................ 700/259, 255; 901/1, 47
See application file for complete search history.

(56) References Cited

U.S. PATENT DOCUMENTS 10,188,580 B2 *  1/2019  Dayal ................. H04W 4/40
10,383,552 B2 *  8/2019  Martinson ........... A61B 5/0077
2006/0184274 A1 *  8/2006  Sakai ................ G05D 1/0246
                                                    700/245

(Continued)

FOREIGN PATENT DOCUMENTS

KR  10-2008-0056669 A  6/2008
KR     10-0904191 B1   6/2009

(Continued)

*Primary Examiner* — Dalena Tran
(74) *Attorney, Agent, or Firm* — Birch, Stewart, Kolasch & Birch, LLP

(57) ABSTRACT

A method of operating a mobile robot according to an aspect of the present disclosure includes receiving a guidance destination input, generating a global path to the received guidance destination, detecting and tracking an obstacle, detecting and tracking a guidance target, upon detecting the guidance target within a reference distance, generating an avoidance path to avoid an obstacle being tracked, calculating a moving speed based on the distance to the guidance target and the obstacle being tracked, and moving based on the avoidance path and the calculated moving speed, thereby comfortably escorting the guidance target to the destination.

14 Claims, 16 Drawing Sheets

(56) References Cited

U.S. PATENT DOCUMENTS

| | | | | |
|---|---|---|---|---|
| 2007/0150108 | A1* | 6/2007 | Yokoyama | G06Q 50/12 700/245 |
| 2008/0147261 | A1* | 6/2008 | Ichinose | G01C 22/006 701/24 |
| 2016/0114488 | A1* | 4/2016 | Mascorro Medina | B25J 11/008 700/259 |

FOREIGN PATENT DOCUMENTS

| | | |
|---|---|---|
| KR | 10-2011-0103537 A | 9/2011 |
| KR | 10-2016-0000162 A | 1/2016 |
| WO | WO 2016/065362 A1 | 4/2016 |

* cited by examiner

METHOD OF OPERATING MOBILE ROBOT

CROSS REFERENCE TO RELATED APPLICATIONS

This application is the National Phase of PCT International Application No. PCT/KR2018/007345, filed on Jun. 28, 2018, which claims priority under 35 U.S.C. 119(a) to Patent Application No. 10-2017-0083627, filed in the Republic of Korea on Jun. 30, 2017, all of which are hereby expressly incorporated by reference into the present application.

TECHNICAL FIELD

The present disclosure relates to a mobile robot and a method of operating the same, and more particularly to a mobile robot and a method of operating the same for providing guidance service and various other services to people in a public place.

BACKGROUND ART

Information is provided to users through electric bulletin boards, guidance signs, etc. in public places, such as airports, railroad stations, harbors, department stores, and performance halls. However, such electric bulletin boards or guidance signs provide the users only with certain information selected by service providers in a unidirectional manner, and do not satisfy the respective demands of individual users.

Meanwhile, in recent years, kiosks that provide information and services to customers using multimedia devices, such as displays, touchscreens, and speakers, have been increasingly used. Even in this case, however, users need to directly manipulate the kiosks. As a result, the kiosks are inconvenient for people who have difficulty in using the kiosks and thus cannot actively satisfy the requirements of users.

Meanwhile, robots have been developed for industrial purposes and have taken charge of portions of factory automation. In recent years, the range of fields in which robots are utilized has further expanded. As a result, medical robots, aerospace robots, etc. have been developed, and home robots that may be used in general houses haven been manufactured.

Therefore, research has been increasingly conducted into methods of providing various kinds of services using robots in public places. In addition, there is the need to devise a method of comfortably escorting a guidance target to a destination.

DISCLOSURE

Technical Problem

It is an object of the present disclosure to provide a mobile robot and a method of operating the same for providing various kinds of services, such as guidance service, in a public place.

It is an object of the present disclosure to provide a mobile robot and a method of operating the same for comfortably escorting a guidance target to a destination in consideration of the position and the speed of the guidance target.

It is an object of the present disclosure to provide a mobile robot and a method of operating the same for generating an optimum and safe guidance path when providing guidance service.

It is an object of the present disclosure to provide a mobile robot and a method of operating the same for easily providing information displayed on a display while providing a service, such as path guidance.

Technical Solution

In order to accomplish the above or other objects, a method of operating a mobile robot according to an aspect of the present disclosure may include receiving a guidance destination input, generating a global path to the received guidance destination, detecting and tracking an obstacle, detecting and tracking a guidance target, upon detecting the guidance target within a reference distance, generating an avoidance path to avoid an obstacle being tracked, calculating a moving speed based on the distance to the guidance target and the obstacle being tracked, and moving based on the avoidance path and the calculated moving speed, thereby comfortably escorting the guidance target to the destination.

Advantageous Effects

According to at least one of embodiments of the present disclosure, various kinds of services, such as guidance service, may be provided in a public place.

In addition, according to at least one of embodiments of the present disclosure, a guidance target may be comfortably escorted to a destination in consideration of the position and the speed of the guidance target.

In addition, according to at least one of embodiments of the present disclosure, an optimum and safe guidance path may be generated when guidance service is provided.

In addition, according to at least one of embodiments of the present disclosure, information displayed on a display may be easily provided while a service such as path guidance is provided.

However, various effects other than those described above will be explicitly disclosed or implied in the following detailed description of embodiments of the present disclosure.

BEST MODE

Figure 1:
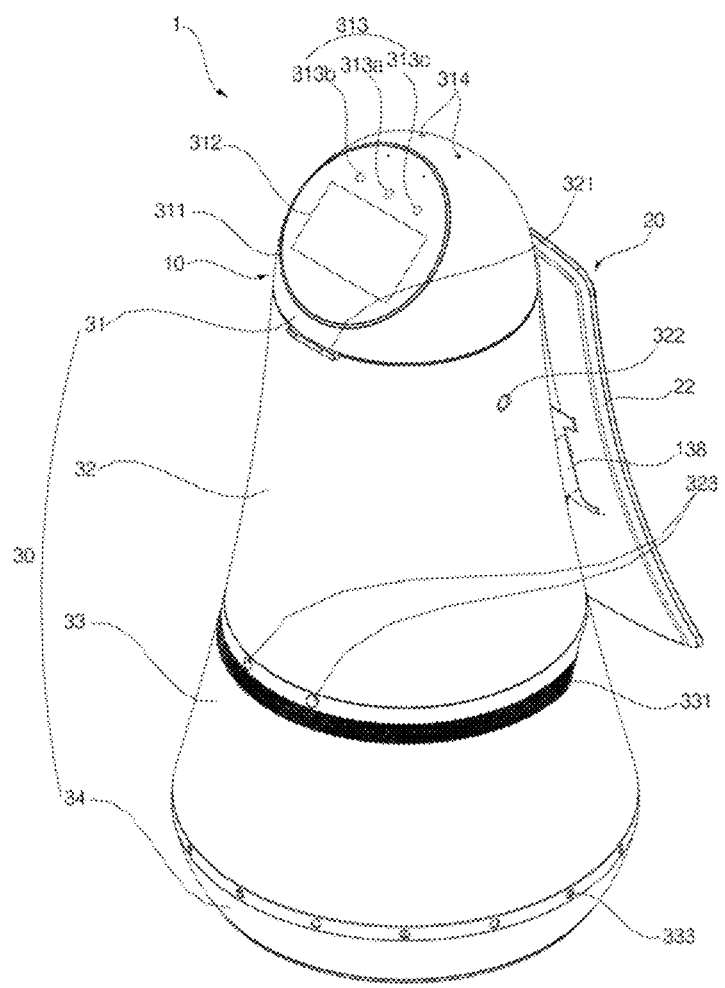
FIG. 1 is a perspective view of a mobile robot according to an embodiment of the present disclosure.

Hereinafter, exemplary embodiments of the present disclosure will be described in detail with reference to the accompanying drawings. However, the present disclosure may be embodied in many different forms and should not be construed as being limited to the embodiments set forth herein.

In the drawings, illustrations of parts unrelated to the description are omitted so as to clearly and briefly describe the present disclosure, and identical or extremely similar components are denoted by the same reference numerals throughout the specification.

As used herein, the terms with which the names of components are suffixed, such as "module" and "unit", are assigned to facilitate preparation of this specification, and are not intended to suggest unique meanings or functions. Accordingly, the terms "module" and "unit" may be used interchangeably.

Figure 2:
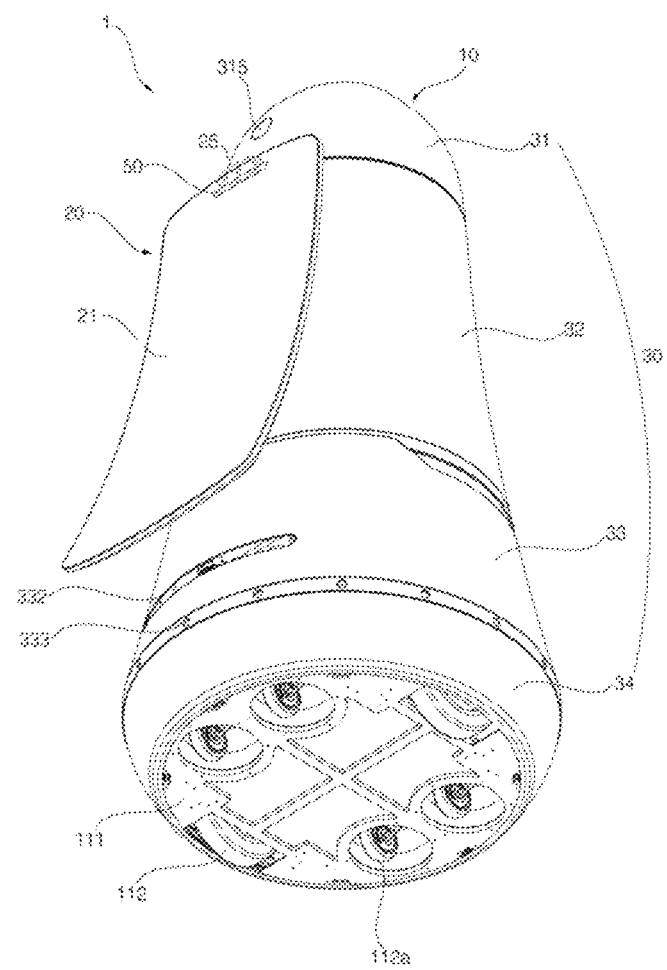
FIG. 2 is a bottom perspective view of the mobile robot according to an embodiment of the present disclosure when viewed from below.
Figure 3:
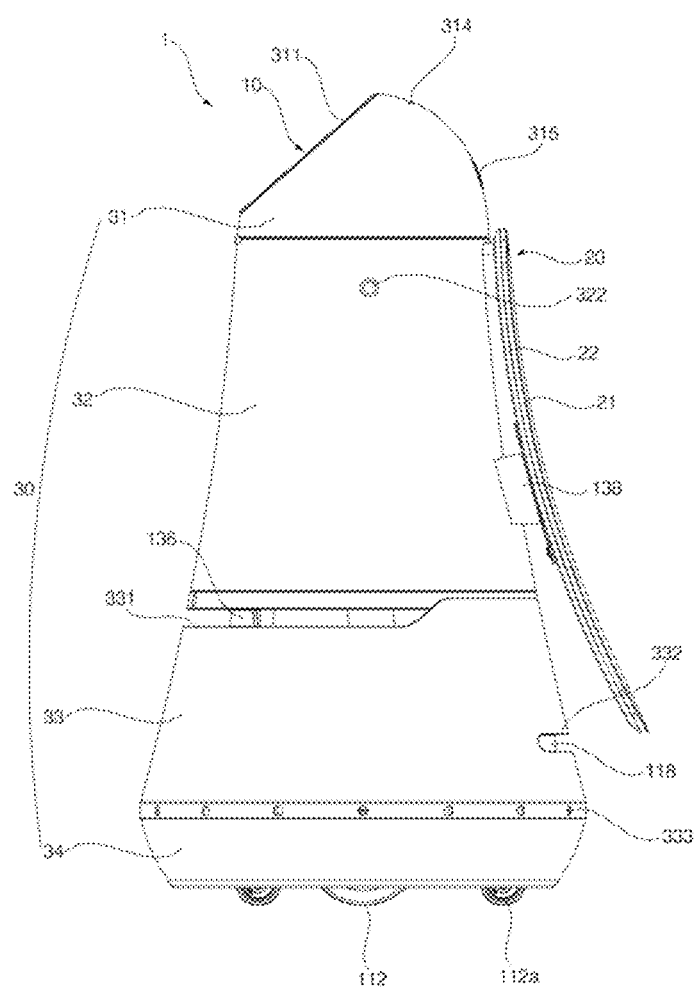
FIG. 3 is a side view of the mobile robot according to an embodiment of the present disclosure.
Figure 4:
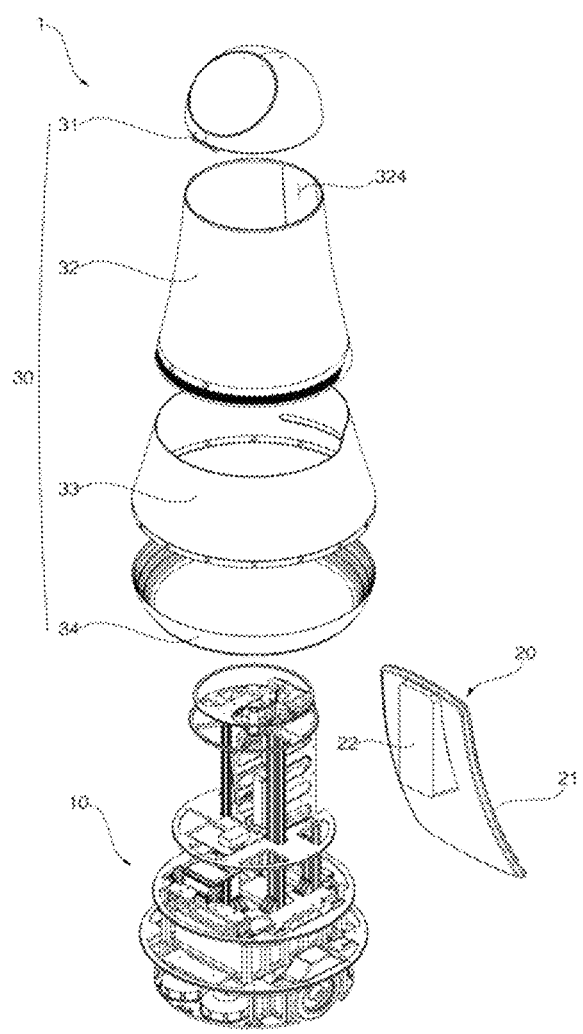
FIG. 4 is an exploded perspective view of the mobile robot according to an embodiment of the present disclosure.

FIG. 1 is a perspective view of a mobile robot according to an embodiment of the present disclosure, FIG. 2 is a bottom perspective view of the mobile robot when viewed from below, FIG. 3 is a side view of the mobile robot, and FIG. 4 is an exploded perspective view of the mobile robot.

Referring to FIGS. 1 to 4, a mobile robot 1 according to an embodiment of the present disclosure may include a main body 10 defining the external appearance of the mobile robot 1 and accommodating various components therein.

The main body 10 may extend long in a vertical direction, and may have a roly-poly shape that becomes slimmer from a lower portion thereof to an upper portion thereof as a whole.

The main body 10 may include a case 30 defining the external appearance of the mobile robot 1. The case 30 may include a top cover 31 disposed on the upper side of the case 30, a first middle cover 32 disposed below the top cover 31, a second middle cover 33 disposed below the first middle cover 32, and a bottom cover 34 disposed below the second middle cover 33. Here, the first middle cover 32 and the second middle cover 33 may be formed as a single middle cover.

The top cover 31 may be located at the upper end of the mobile robot 1, and may have a hemispherical shape or a dome shape. The top cover 31 may be located at a height that is lower than the height of an adult in order to easily receive a command from a user. Further, the top cover 31 may be configured to be rotatable to a predetermined angle.

Meanwhile, the top cover 31 and a head part 15 disposed therein may be disposed at the uppermost portion of the mobile robot 1, and may have a shape and a function similar to those of a human head to interact with the user. Thus, the top cover 31 and the head part 15 disposed therein may be referred to as a "head". In addition, the remaining part, which is disposed below the head, may be referred to as a "body".

The top cover 31 may include a manipulator 311 provided on one side of the front surface thereof. The manipulator 311 may function to receive a command from the user. To this end, the manipulator 311 may include a display 312 configured to receive a touch input from the user.

Hereinafter, a display 312 disposed at the manipulator 311 is referred to as a "head display 312", and a display part 20 disposed at the body is referred to as a "body display part 20".

The head display 312 may be implemented as a touchscreen that has a layered structure with a touch pad. In this case, the head display 312 may be used not only as an output device but also as an input device to which information is input via a user's touch.

In addition, the manipulator 311 may be oriented upwards at a predetermined angle such that the user may easily manipulate the head display 312 while looking down at the same. For example, the manipulator 311 may be disposed on a surface formed by cutting a portion of the top cover 31. Thus, the head display 312 may be disposed at an incline.

In addition, the manipulator 311 may have a circular or elliptical shape overall. The manipulator 311 may be embodied similar to the shape of a human face.

In one example, the manipulator 311 may have a circular shape, and one or more structures for expressing the eyes, nose, mouth, eyebrows, etc. of a human being may be located on the manipulator 311.

That is, a specific structure may be disposed on the manipulator 311, or a specific design may be painted on the manipulator 311 in order to express the eyes, nose, mouth, eyebrows, etc. of a human being. Therefore, the manipulator 311 may have the shape of a human face, thereby creating an emotional connection with the user. Furthermore, when a robot having the shape of a human face travels, it may give a feeling as if a person were moving, thereby relieving an unpleasant feeling with respect to the robot.

In another example, one or more images for expressing the eyes, nose, mouth, eyebrows, etc. of a human being may be displayed on the head display 312.

That is, not only information related to a path guidance service but also various images for expressing the shape of a human face may be displayed on the head display 312. In addition, an image for expressing a predetermined facial expression may be displayed on the head display 312 at a predetermined time interval or at a specific time point.

Meanwhile, on the basis of FIG. 1, the direction in which the manipulator 311 is oriented is defined as a "front side". Further, the direction opposite the "front side" is defined as a "rear side".

In addition, the manipulator 311 may be provided with a head camera 313 for recognizing a person and an object.

The head camera 313 may be disposed on the upper side of the head display 312. The head camera 313 may include a 2D camera 313a and RGBD sensors 313b and 313c.

The 2D camera 313a may be a sensor configured to recognize a person or an object based on a 2-dimensional image.

The RGBD (Red, Green, Blue, and Distance) sensors 313b and 313c may be sensors configured to acquire the position or facial image of a person. The RGBD sensors 313b and 313c may be sensors configured to detect a person or an object using captured images having depth data, which are acquired by a camera having RGBD sensors or another similar 3D imaging device.

The RGBD sensors 313b and 313C may be provided in a plural number in order to accurately detect the position or facial image of a person. In one example, two RGBD sensors 313b and 313c may be provided, and may be disposed on the left side and the right side of the 2D camera 313a, respectively.

Although not illustrated, the manipulator 311 may further include a physical button configured to directly receive a command from the user.

In addition, the top cover 31 may further include a microphone 314.

The microphone 314 may function to receive a command of an audio signal from the user. In one example, four microphones 314 may be formed at specific points in the upper end portion of the top cover 31 in order to accurately receive a voice command from the user. Thus, even when the mobile robot 1 is traveling or even when the top cover 31 is rotating, a verbal request for path guidance may be accurately received from the user.

According to an embodiment of the present disclosure, while the mobile robot 1 is traveling, the top cover 31 may be rotated such that the manipulator 311 is oriented in the travel direction. Further, when the mobile robot 1 receives a command (e.g. a voice command or the like) from the user while traveling, the top cover 31 may be rotated such that the manipulator 311 is oriented toward the position at which the user is located.

Unlike this, when the mobile robot 1 receives a command from the user while traveling, the top cover 31 may be rotated in a direction opposite the direction in which the mobile robot 1 is traveling. That is, the top cover 31 may be rotated in the direction in which the body display part 20 is oriented. Thus, the user may effectively manipulate the manipulator 311 while viewing path guidance service information displayed on the body display part 20.

Figure 5:
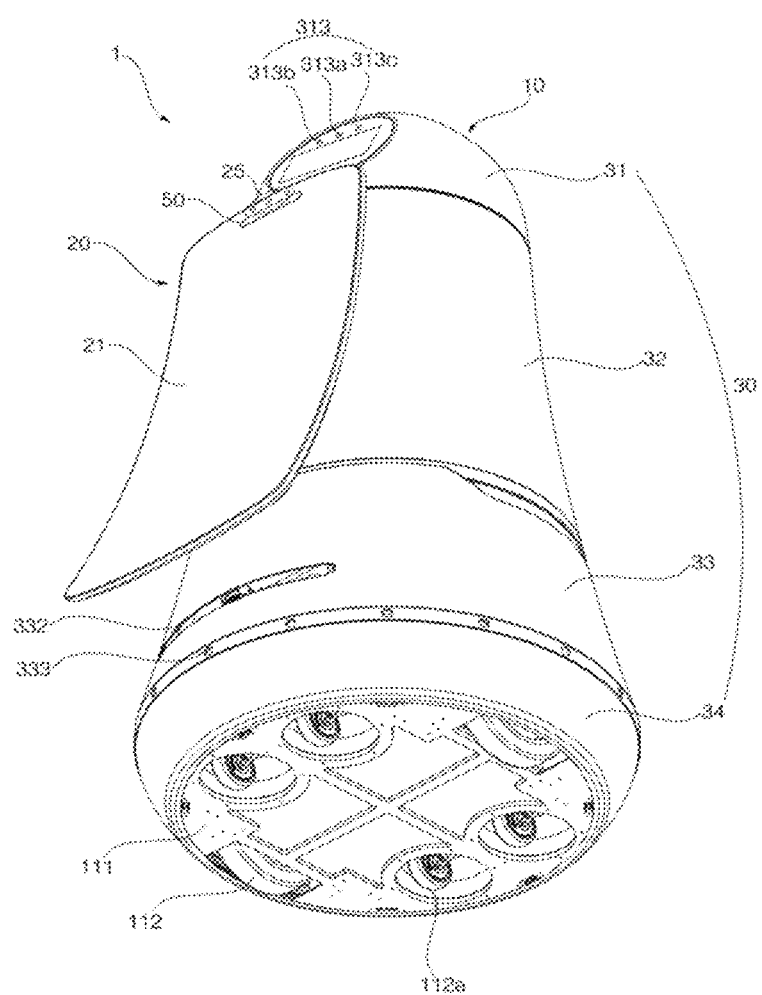
FIG. 5 is a view illustrating the arrangement of displays of the mobile robot according to an embodiment of the present disclosure.

FIG. 5 is a view illustrating the arrangement of the displays 312 and 20 of the mobile robot 1 according to an embodiment of the present disclosure.

Referring to FIG. 5, when the mobile robot 1 receives a command from the user or stands by, the displays 312 and 20 may be oriented in the same direction, and thus the user or people in a public place may more easily view the information displayed on the two displays 312 and 20.

Meanwhile, the direction in which the manipulator 311 is oriented and the direction in which the body display part 20 is oriented may be opposite each other. In this case, for example, the manipulator 311 may be oriented in one direction, and the display 20 may be oriented in a direction opposite the one direction. Thus, there is an advantage in that information displayed on the manipulator 311 or the body display part 20 may be viewed from opposite directions.

Preferably, when the mobile robot 1 is traveling or stationary, the direction in which the manipulator 311 is oriented and the direction in which the body display part 20 is oriented may differ from each other.

For example, when the mobile robot 1 is traveling, the direction in which the manipulator 311 is oriented and the direction in which the body display part 20 is oriented may be opposite each other, as illustrated in FIG. 1.

Further, when the mobile robot 1 stands by, the direction in which the manipulator 311 is oriented and the direction in which the body display part 20 is oriented may be the same as each other, as illustrated in FIG. 5.

In addition, the top cover 31 may further include an emergency manipulation button 315. The emergency manipulation button 315 may function to immediately stop the operation of the mobile robot 1 when the mobile robot 1 is stationary or traveling. In one example, the emergency manipulation button 315 may be located on the rear side of the mobile robot 1 such that the user may easily manipulate the emergency manipulation button 315 even when the mobile robot 1 is traveling forwards.

The first middle cover 32 may be disposed below the top cover 31. Various electronic components including a substrate may be located inside the first middle cover 32. The first middle cover 32 may have a cylindrical shape that gradually increases in diameter from the upper portion thereof to the lower portion thereof.

More preferably, the first middle cover 32 may include an RGBD sensor 321.

The RGBD sensor 321 may function to sense a collision between the mobile robot 1 and an obstacle while the mobile robot 1 is traveling. To this end, the RGBD sensor 321 may be located in the direction in which the mobile robot 1 travels, that is, on the front side of the first middle cover 32. In one example, the RGBD sensor 321 may be located at the upper end portion of the first middle cover 32 in consideration of the height of an obstacle or a person present ahead of the mobile robot 1. However, the disclosure is not limited thereto. The RGBD sensor 321 may be disposed at any of various locations on the front side of the first middle cover 32.

In another embodiment, the RGBD sensor 321 may not be disposed at the first middle cover 32. Further, the function of the RGBD sensor 321 may be performed by the head camera 313.

In addition, the first middle cover 32 may further include a speaker hole 322.

The speaker hole 322 may be a hole for transferring sound generated by a speaker to the outside. The speaker hole 322 may be formed in the outer circumferential surface of the first middle cover 32, and may be provided in a singular number. However, unlike this, a plurality of speaker holes 322 may be formed so as to be spaced apart from each other in the outer circumferential surface of the first middle cover 32.

In addition, the first middle cover 32 may further include a stereo camera hole 323.

The stereo camera hole 323 may be a hole for the operation of a stereo camera (refer to 137 in FIG. 6) installed inside the main body 10. In one example, the stereo camera hole 323 may be formed in the lower end of the front side of the first middle cover 32. Accordingly, the stereo camera 137 may photograph an area ahead of the mobile robot 1 through the stereo camera hole 323.

The second middle cover 33 may be disposed below the first middle cover 32. A battery, a lidar for autonomous driving, and the like may be located inside the second middle cover 33. Like the first middle cover 32, the second middle cover 33 may have a cylindrical shape that gradually increases in diameter from the upper portion thereof to the lower portion thereof. Further, the outer side of the second middle cover 33 and the outer side of the first middle cover 32 may be connected to each other without a step therebetween. That is, since the outer side of the second middle cover 33 and the outer side of the first middle cover 32 may be smoothly connected to each other, the external appearance thereof may be more aesthetically pleasing.

Further, the first middle cover 32 and the second middle cover 33 may have cylindrical shapes that gradually increase in diameter from the upper portions thereof to the lower portions thereof, and thus may have a roly-poly shape as a whole. Thus, when the main body 10 collides with a person or an obstacle, the impact generated thereby may be alleviated.

In detail, the second middle cover 33 may include a first cutout 331.

The first cutout 331 may be formed from the front side to the lateral sides of the outer circumferential surface of the second middle cover 33. The first cutout 331 is a portion that is formed by cutting the second middle cover 33 such that a front lidar 136, which will be described later, may be operated.

In detail, the first cutout 331 may be formed by cutting the outer circumferential surface of the front side of the second middle cover 33 by a predetermined length in a radial direction. Here, the front lidar 136 is located inside the second middle cover 33. Further, the first cutout 331 may be formed in the outer circumferential surface of the second middle cover 33, which corresponds to the position of the front lidar 136, by cutting the peripheral portion of the second middle cover 33. That is, the first cutout 331 and the front lidar 136 may face each other. Thus, the front lidar 136 may be exposed to the outside through the first cutout 331.

In one example, the first cutout 331 may be formed by cutting the front side of the second middle cover 33 along the periphery thereof by 270 degrees. The reason for forming the first cutout 331 in the second middle cover 33 is to prevent a laser beam emitted from the front lidar 136 from being directly radiated into the eyes of an adult or a child.

In addition, the second middle cover 33 may further include a second cutout 332.

The second cutout 332 may be formed from the rear side to the lateral sides of the outer circumferential surface of the second middle cover 33. The second cutout 332 is a portion that is formed by cutting the second middle cover 33 such that a rear lidar 118, which will be described later, may be operated.

In detail, the second cutout 332 may be formed by cutting the outer circumferential surface of the rear side of the second middle cover 33 by a predetermined length in the radial direction. Here, the rear lidar 118 is located inside the second middle cover 33. Further, the second cutout 332 may be formed at a point corresponding to the position of the rear lidar 118 by cutting the peripheral portion of the second middle cover 33. Thus, the rear lidar 118 may be exposed to the outside through the second cutout 332. In one example, the second cutout 332 may be formed by cutting the rear side of the second middle cover 33 along the periphery thereof by 130 degrees.

In this embodiment, the first cutout 331 may be spaced apart from the second cutout 332 in the vertical direction so as not to be connected to the second cutout 332. Further, the first cutout 331 may be located above the second cutout 332.

If the first cutout 331 and the second cutout 332 are located along the same line, a laser beam emitted from a lidar of one mobile robot may be radiated to a lidar of another mobile robot. This may cause interference between the laser beams emitted from the lidars of respective mobile robots, thus making it difficult to accurately detect a distance. In this case, because it is impossible to detect the distance between the mobile robot and an obstacle, there is a problem in that it is difficult to move normally, and the mobile robot collides with the obstacle.

In addition, the second middle cover 33 may be further provided with an ultrasonic sensor 333.

The ultrasonic sensor 333 may be a sensor configured to measure the distance between an obstacle and the mobile robot 1 using an ultrasonic signal. The ultrasonic sensor 333 may function to detect an obstacle that is present close to the mobile robot 1.

In one example, the ultrasonic sensor 333 may be provided in a plural number in order to detect obstacles that are present close to the mobile robot 1 in all directions. Further, the plurality of ultrasonic sensors 333 may be located so as to be spaced apart from each other along the periphery of the lower end portion of the second middle cover 33.

The bottom cover 34 may be disposed below the second middle cover 33. Wheels 112, casters 112a, and the like may be located inside the bottom cover 34. The bottom cover 34 may have a cylindrical shape that gradually decreases in diameter from the upper portion thereof to the lower portion thereof, unlike the first middle cover 32 and the second middle cover 33. That is, the main body 10 may have a roly-poly shape as a whole, and thus may reduce the amount of impact applied thereto in the event of collision of the robot. The lower end portion of the main body 10 has an inwardly depressed structure, thereby preventing a foot of a person from being caught in the wheels of the robot.

In detail, a base 111 may be located inside the bottom cover 34.

The base 111 may define the bottom surface of the mobile robot 1.

Further, the wheels 112 for driving the mobile robot 1 may be provided in the base 111. Each of the wheels 112 may be located on a respective one of the left side and the right side of the base 111.

In addition, the casters 112a for assisting the driving of the mobile robot 1 may be provided in the base 111. Here, the casters 112a may be provided in a plural number in order to enable manual movement of the mobile robot 1. In one example, each two of the casters 112a may be located on a respective one of the front side and the rear side of the base 111.

According to the above-described structure of the casters, there is an advantage in that when the mobile robot 1 is turned off or when the mobile robot 1 needs to be moved manually, the mobile robot 1 may be pushed and moved without applying a large amount of force thereto.

The body display part 20 may be formed on one side of the mobile robot 1 so as to extend long in the vertical direction.

In detail, the body display part 20 may include a body display 21 and a support part 22.

The body display 21 may be located on the rear side of the first middle cover 32. The body display 21 may function to output visual information (e.g. airport gate inquiry information, path guidance service information, and the like) related to the service currently being provided.

Further, the body display 21 may be embodied as a curved display that is curved outwards at a predetermined curvature. That is, the body display 21 may have a generally concave shape. The body display 21 may have a shape that is gradually further inclined backwards from the upper portion thereof to the lower portion thereof. In other words, the body display 21 may be formed such that the distance from the case 30 gradually increases from the upper portion thereof to the lower portion thereof.

According to the above-described structure of the display part, there is an advantage in that information displayed on the body display 21 is readily visible even from a location that is far from the mobile robot 1, and the information displayed on the body display 21 is seen without distortion as well, even at various angles.

In addition, according to an embodiment of the present disclosure, the mobile robot 1 may lead the user along a set path in order to show the user the way. The user may view the body display part 20 installed on the rear side of the mobile robot 1 while following the mobile robot 1. That is, even when the mobile robot 1 travels for path guidance, the user may easily view information displayed on the body display part 20 while following the mobile robot 1.

Further, the upper end of the body display 21 may extend to the upper end of the first middle cover 32, and the lower end of the body display 21 may extend to the second cutout 332. In this embodiment, the lower end of the body display 21 needs to be formed so as not to extend beyond the second cutout 332. When the body display 21 covers the second cutout 332, the laser beam emitted from the rear lidar 118 strikes the lower end of the body display 21. Accordingly, a problem may occur in which the mobile robot 1 is not capable of detecting a distance to an obstacle that is present behind the mobile robot 1.

Meanwhile, the support part 22 may function to support the body display 21 such that the body display 21 is located on the rear side of the first middle cover 32. The support part 22 may extend from the rear surface of the body display 21. The support part 22 may vertically extend long from the rear surface of the body display 21, and may gradually further protrude from the upper portion thereof to the lower portion thereof.

Further, the support part 22 may be inserted into the first middle cover 32 through the rear side of the first middle cover 32. To this end, an opening 324, through which the support part 22 may pass, may be formed in the rear side of the first middle cover 32. The opening 324 may be formed by cutting a portion of the rear side of the outer circumferential surface of the first middle cover 32.

Further, the body display part 20 may be fixed to the inside of the main body 10 using a separate fixing member 138.

The fixing member 138, configured to fix the body display part 20 to the main body 10, may be provided inside the main body 10. One side of the fixing member 138 may be fixed to the main body 10, and the opposite side thereof may be fixed to the body display part 20. To this end, the opposite side of the fixing member 138 may protrude to the outside of the case 30 through the opening 324. That is, the support part 22 and the fixing member 138 may be located inside the opening 324 together.

In this embodiment, the body display part 20 may be fastened to the fixing member 138 via a fastener. In this case, the support part 22 of the body display part 20 may be seated on the fixing member 138. In other words, the support part 22 may be seated on the fixing member 138, and a portion of the fixing member 138 may be fixed to a portion of the body display part 20. According to this display-part fixing structure, the body display part 20 may be stably located on the rear side of the first middle cover 32.

Meanwhile, the body display part 20 may further include a ticket slot 50. In this embodiment, an example in which the ticket slot 50 is disposed in the body display part 20 is illustrated. However, the present disclosure is not limited thereto. The ticket slot 50 may be disposed in any other region of the mobile robot 1.

According to an embodiment of the present disclosure, when a ticket, such as an airline ticket, is inserted into the ticket slot 50, the mobile robot 1 may scan a barcode, a QR code, or the like included in the ticket.

In addition, the mobile robot 1 may display the scanning result on the body display 21, and may provide the user with gate information, counter information, etc. based on the scanning result.

Meanwhile, the body display part 20 may further include a body camera part 25 for identifying and tracking a guidance target.

The body camera part 25 may be configured as a 3D sensor, such as an RGBD camera sensor, and may sense whether a guidance target is present, the distance between the guidance target and the mobile robot 1, and the speed of the guidance target in a guidance mode.

In another embodiment, the mobile robot 1 may not include the body camera part 25, but may further include a sensor provided at any other region thereof for identifying and tracking a guidance target.

Figure 6:
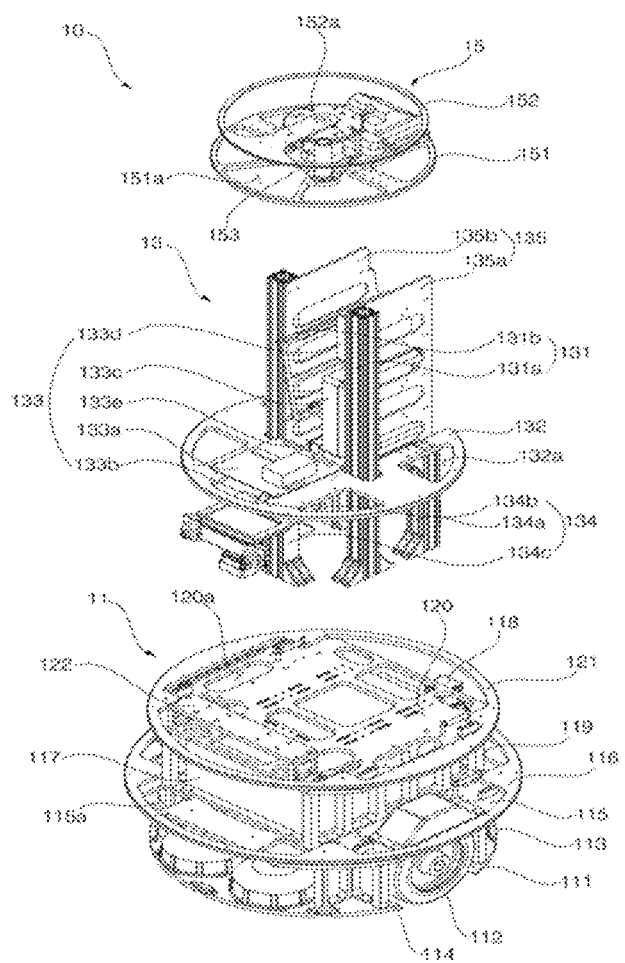
FIG. 6 is an exploded perspective view of a main body of the mobile robot according to an embodiment of the present disclosure.

FIG. 6 is an exploded perspective view of the main body of the mobile robot.

Referring to FIG. 6, the main body 10 according to the present disclosure may include a driver 11. The driver 11 may include a plurality of components for driving the mobile robot 1.

In detail, the driver 11 may include the base 111. The base 111 may define the bottom surface of the mobile robot 1.

The base 111 may have a circular plate shape, and may be located inside the bottom cover 34.

In addition, the driver 11 may further include the wheels 112 for driving the mobile robot 1 and motors (not shown) configured to transfer power to the wheels 112. The wheels 112 may be rotated by the power transferred from the motors. The wheels 112 may be provided in a pair, and each thereof may be disposed on a respective one of the left side and the right side of the base 111. The motors may be provided in a pair, and each thereof may be coupled to a respective one of the pair of wheels 112. However, the present disclosure is not limited thereto. A single motor may be provided to drive the pair of wheels 112.

Meanwhile, the mobile robot 1 may further include a cliff sensor 113.

The cliff sensor 113 may be a sensor configured to detect a precipice, a cliff, or the like within the movement range of the mobile robot 1 in all directions throughout 360 degrees. The cliff sensor 113 may be provided in a plural number.

In one example, the plurality of cliff sensors 113 may be disposed along the edge of the base 111 so as to be spaced apart from each other.

Further, the cliff sensors 113 may be disposed along the region adjacent to the front lidar 136 and the first cutout 331 so as to be oriented toward a front-lower side. Accordingly, the cliff sensors 113 may sense a cliff or the approach of children.

In addition, the driver 11 may further include a first support rib 114. The first support rib 114 may support a first support plate 115, which will be described later. The first support rib 114 may extend upwards from the top surface of the base 111. In one example, the first support rib 114 may extend upwards from the edge of the base 111. The first support rib 114 may be provided in a plural number. Some of the plurality of first support ribs 114 may be formed to be hollow or to have a recessed side in order to minimize the weight thereof.

In this embodiment, two first support ribs 114 may be connected to each other in a shape. However, the present disclosure is not limited thereto. The first support ribs 114 may be disposed in any of various positions and shapes.

In addition, the driver 11 may further include the first support plate 115.

The first support plate 115 may be seated on the first support ribs 114. The first support plate 115 may have a plate shape. Further, the first support plate 115 may include a volume-reducing hole 115a in order to minimize the weight thereof. The volume-reducing hole 115a may be provided in a plural number, and the plurality of volume-reducing holes 115a may be formed in the top surface of the first support plate 115 so as to be spaced apart from each other.

In addition, the driver 11 may further include a first bumper 116. When an impact is applied from the outside, the first bumper 116 may be moved forwards and backwards to absorb a predetermined amount of impact. The first bumper 116 may be formed in a hollow ring shape, and may be disposed on the top surface of the first support plate 115.

In addition, the driver 11 may further include a battery 117.

The battery 117 may supply electric power for driving of the mobile robot 1. The battery 117 may be disposed at the center of the top surface of the first support plate 115 in consideration of the center of gravity of the mobile robot 1. Because the battery 117 accounts for the greatest portion of the total weight of the mobile robot 1, the battery 117 may be preferably located at a lower portion of the main body 10.

In addition, the rear lidar 118 may be disposed in the driver 11.

The rear light detection and ranging (lidar) 118, which is a laser radar, may be a sensor configured to perform location recognition by radiating a laser beam and collecting and analyzing a backwardly scattered light beam among light beams absorbed or scattered by an aerosol. The rear lidar 118 may be disposed on the rear side of the first support plate 115. That is, the rear lidar 118 may be disposed so as to be oriented in the backward direction of the mobile robot 1. Further, the rear lidar 118 may be exposed to the outside through the second cutout 332 formed in the second middle cover 33.

In addition, the driver 11 may further include a second support rib 119. The second support rib 119 may support a second support plate 120, which will be described later. The second support rib 119 may extend upwards from the top surface of the first support plate 115.

Specifically, the second support rib 119 may be formed at the edge of the battery 117. In one example, a plurality of second support ribs 119 may be formed on opposite sides of the battery 117 so as to be spaced apart from each other. The plurality of second support ribs 119 may be formed to increase a supporting force, and the upper ends of the plurality of second support ribs 119 may be connected to each other. That is, the second support ribs 119 may have an arch shape. However, the present disclosure is not limited thereto. The second support ribs 119 may be formed in any of various shapes.

In addition, the driver 11 may further include the second support plate 120. The second support plate 120 may be seated on the second support ribs 119. The second support plate 120 may have a plate shape. Further, the second support plate 120 may include a volume-reducing hole 120a in order to minimize the weight thereof. The volume-reducing hole 120a may be provided in a plural number, and the plurality of volume-reducing holes 120a may be formed in the top surface of the second support plate 120 so as to be spaced apart from each other.

In addition, the driver 11 may further include a second bumper 121. When an impact is applied from the outside, the second bumper 121 may be moved forwards and backwards to absorb a predetermined amount of impact, like the first bumper 116. The second bumper 121 may be formed in a ring shape, and may be disposed on the top surface of the second support plate 120.

In addition, the driver 11 may further include a height-adjusting rib 122. The height-adjusting rib 122 may provide a predetermined height to the front lidar 136, which will be described later. The height-adjusting rib 122 may be disposed below the front lidar 136, and may aid in adjusting the heights of the front lidar 136 and the first cutout 331. The height-adjusting rib 122 may extend upwards from the front side of the top surface of the second support plate 120.

Meanwhile, the main body 10 may further include a body part 13. The body part 13 may be disposed above the driver 11, and various substrates 133, on which circuit elements are mounted to control the overall operation of the mobile robot 1, may be provided in the body part 13. In this embodiment, the substrates 133 may include a first substrate 133a, a second substrate 133b, a third substrate 133c, a fourth substrate 133d, and a fifth substrate 133e.

In detail, the body part 13 may include a main frame 131. The main frame 131 may support the body display part 20 and the head part 15, which will be described later. The main frame 131 may include a first main frame 131a and a second main frame 131b. The first main frame 131a and the second main frame 131b may have a column shape that extends long vertically. The first main frame 131a and the second main frame 131b may be fixed to the top surface of the second support plate 120.

In one example, the first main frame 131a and the second main frame 131b may be spaced apart from the center of the second support plate 120 toward opposite sides of the second support plate 120 by the same interval. That is, the first main frame 131a and the second main frame 131b may be bilaterally symmetrical with each other with respect to the center of the second support plate 120. Further, the head part 15 may be coupled to the upper ends of the first main frame 131a and the second main frame 131b.

In addition, the body part 13 may further include a third support plate 132. The third support plate 132 may be penetrated by the main frame 131, and may be fitted in a specific point of the main frame 131. The third support plate 132 may be located below a bisector with respect to a point bisecting the main frame 131. The third support plate 132 may have a disc shape, and may include a volume-reducing hole 132a to minimize the weight thereof.

In addition, the body part 13 may further include the first substrate 133a. The first substrate 133a may be disposed on the top surface of the third support plate 132. The first substrate 133a may include, for example, an application processor (AP) board. The AP board may function as a device for managing the entire system of the hardware module of the mobile robot 1, that is, may function as a controller (refer to 740 in FIG. 7).

In addition, the body part 13 may further include a subframe 134. The subframe 134 may be formed below the third support plate 132, and may function to support the third support plate 132. The subframe 134 is formed to be lower than the height of the main frame 131.

Specifically, the subframe 134 may include a first subframe 134a and a second subframe 134b. The first subframe 134a and the second subframe 134b may have a column shape that extends long vertically. Further, the first subframe 134a and the second subframe 134b may be fixed to the top surface of the second support plate 120.

The first subframe 134a and the second subframe 134b may be disposed adjacent to the main frame 131. In one example, the first subframe 134a and the second subframe 134b may be spaced backwards apart from the first main frame 131a and the second main frame 131b, respectively, by the same interval. That is, the first subframe 134a and the second subframe 134b may be bilaterally symmetrical with each other with respect to the center of the second support plate 120. Further, the third support plate 132 may be coupled to the upper ends of the first subframe 134a and the second subframe 134b.

In addition, the subframe 134 may further include a third subframe 134c. The third subframe 134c may have a column shape that extends long vertically. Further, the third subframe 134c may be fixed to the top surface of the second support plate 120, like the first subframe 134a and the second subframe 134b.

Further, the third subframe 134c may be disposed adjacent to the main frame 131. In one example, the third subframe 134c may be spaced forwards apart from the center of the second support plate 120 by a predetermined distance. That is, the third subframe 134c may be located in front of the second support plate 120 in consideration of the center of gravity of the third support plate 132. Further, the third support plate 132 may be coupled to the upper end of the third subframe 134c.

In addition, the body part 13 may further include a bracket 135. The bracket 135 may have a plate shape, may vertically extend long, and may be coupled to the main frame 131. Specifically, the bracket 135 may include a first bracket 135a and a second bracket 135b.

The first bracket 135a may be coupled to the first main frame 131a, and the second bracket 135b may be coupled to the second main frame 131b.

The first bracket 135a and the second bracket 135b may be disposed so as to face each other. That is, the first bracket 135a and the second bracket 135b may be respectively fixed to the surfaces of the first main frame 131a and the second main frame 131b that face each other.

Further, the first bracket 135a and the second bracket 135b may extend downwards from the upper ends of the first main frame 131a and the second main frame 131b, respectively. Further, the lower portion of the first bracket 135a and the lower portion of the second bracket 135b may pass through the third support plate 132.

In addition, the body part 13 may further include the second substrate 133b. The second substrate 133b may be disposed in the first bracket 135a. Specifically, the second substrate 133b may be disposed at the lower end of the first bracket 135a. The second substrate 133b may include, for example, a microcontroller unit (MCU) board. The MCU board may control the overall operation of the mobile robot 1. Further, a memory may be disposed on the second substrate 133b, or the MCU board may include a memory in which data for supporting various functions of the mobile robot 1 is stored.

In addition, the body part 13 may further include the third substrate 133c. The third substrate 133c may be disposed in the first bracket 135a. Specifically, the third substrate 133c may be disposed on the second substrate 133b. The third substrate 133c may include, for example, a stereo board. The stereo board may process sensing data collected by various sensors and cameras to manage data for recognizing the position of the mobile robot 1 and recognizing an obstacle.

In addition, the body part 13 may further include the fourth substrate 133d. The fourth substrate 133d may be disposed in the first bracket 135a. Specifically, the fourth substrate 133d may be disposed on the third substrate 133c. The fourth substrate 133d may include, for example, a user interface board.

The user interface board may control the operation of a component that is responsible for user input/output.

In addition, the body part 13 may further include the fifth substrate 133e. The fifth substrate 133e may be disposed in the second bracket 135b. Specifically, the fifth substrate 133e may be disposed inside the second bracket 135b so as to face the second substrate 133b. The fifth substrate 133e may include, for example, a power board. The power board may control the supply of electric power from the battery 117 to the respective components included in the mobile robot 1.

In this embodiment, the body part 13 is described as including the five substrates 133a, 133b, 133c, 133d and 133e. However, the number of substrates 133 is not limited to the above number, and may be smaller or larger than the above number. Further, because the aforementioned types of substrates are described by way of example, it will be apparent that the types of substrates are not limited to the aforementioned types of substrates.

In addition, the body part 13 may further include the front lidar 136. The front lidar 136, which is a laser radar, may be a sensor configured to perform location recognition by radiating a laser beam and collecting and analyzing a backwardly scattered light beam among light beams absorbed or scattered by an aerosol. The front lidar 136 may have the same configuration as the rear lidar 118. However, the front lidar 136 may be located on the front side of the second support plate 120. That is, the front lidar 136 may be disposed so as to be oriented in the forward direction of the mobile robot 1. Further, the front lidar 136 may be exposed to the outside through the first cutout 331 formed in the second middle cover 33. Further, the front lidar 136 may be seated on the height-adjusting rib 122 formed on the second support plate 120.

In addition, the body part 13 may further include a stereo camera 137. The stereo camera 137 may function to detect an obstacle that is present in front of the mobile robot 1 together with the RGBD sensor 321. The stereo camera 137 may acquire a stereoscopic image using two cameras, and may measure the distance between the mobile robot 1 and the obstacle through the acquired stereoscopic image. In one example, the stereo camera 137 may be located directly above the front lidar 136. To this end, the stereo camera 137 may be fixed to one side of the third subframe 134c. Further, the stereo camera 137 may photograph an area ahead of the mobile robot 1 through the stereo camera hole 323 formed in the first middle cover 32.

In addition, the main body 10 may further include the head part 15. The head part 15 may be disposed above the body part 13. Further, the top cover 31 may be coupled to the head part 15, and the head part 15 may be configured to rotate the top cover 31.

In detail, the head part 15 may include a fourth support plate 151. The fourth support plate 151 may be seated on the upper end of the main frame 131, and may be coupled to the main frame 131. The fourth support plate 151 may have a disc shape, and may include a volume-reducing hole 151a to minimize the weight thereof.

In addition, the head part 15 may further include a rotation member 152. The rotation member 152 may be disposed on the fourth support plate 151, and may be configured to be rotatable to a predetermined angle. The rotation member 152 may have a ring shape. Further, the rotation member 152 may be coupled to a rotation motor, which will be described later. To this end, the rotation member 152 may include a motor-coupling portion 152a, which extends from any point on the edge of the rotation member 152 toward the center of the rotation member 152. Further, the top cover 31 may be coupled to the edge of the rotation member 152. Therefore, the top cover 31 may be rotated together by rotation of the rotation member 152.

In addition, the head part 15 may further include a rotation motor 153. The rotation motor 153 may provide power for rotating the rotation member 152. The rotation motor 153 may have a rotary shaft, and the rotary shaft may be coupled to the motor-coupling portion 152a. Thus, the rotation member 152 may be rotated in one direction or in the opposite direction by driving of the rotation motor 153. The rotation motor 153 may include, for example, a DC motor. However, the present disclosure is not limited thereto. Any of various motors, such as a stepping motor, may be applied.

Figure 7:
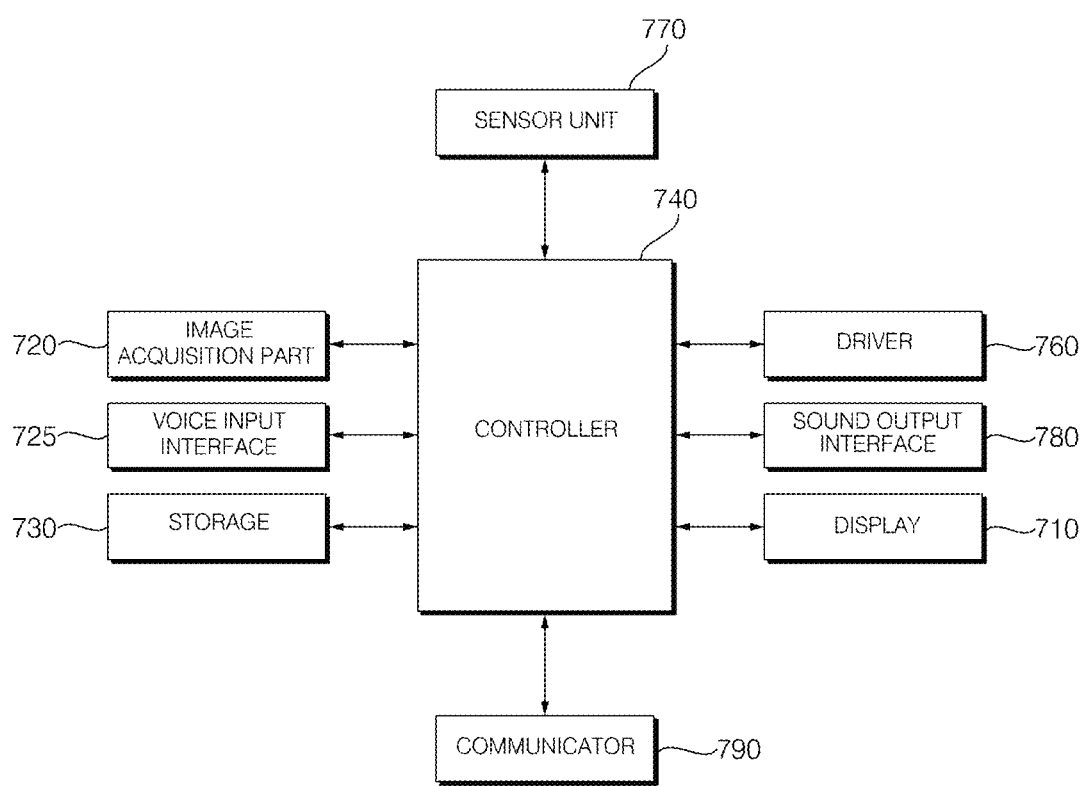
FIG. 7 is a block diagram illustrating the control relationships among main components of the mobile robot according to an embodiment of the present disclosure.

FIG. 7 is a block diagram illustrating the control relationships among main components of the mobile robot according to an embodiment of the present disclosure.

Referring to FIG. 7, the mobile robot 1 according to an embodiment of the present disclosure may include a voice input interface 725 for receiving user voice input through the microphone 314, a storage 730 for storing various kinds of data, a communicator 790 for transmitting and receiving data to and from other electronic devices, such as a server (not shown), and a controller 740 for controlling the overall operation of the mobile robot 1. The above components may be mounted on the above-described substrates 133.

The voice input interface 725 may include a processor or may be connected to a processor for converting an analog sound into digital data, and may convert a user-input voice signal into data that may be recognized by the controller 740 or the server (not shown).

The controller 740 may control the voice input interface 725, the storage 730, and the communicator 790, which constitute the mobile robot 1, and may control the overall operation of the mobile robot 1.

The storage 730, which records various kinds of information necessary to control the mobile robot 1, may include a volatile or nonvolatile recording medium. The recording medium may store data that can be read by a microprocessor, and may include a hard disk drive (HDD), a solid-state disk (SSD), a silicon disk drive (SDD), ROM, RAM, CD-ROM, a magnetic tape, a floppy disk, and an optical data storage device.

In addition, the storage 730 may store various kinds of data necessary for the mobile robot 1 to provide guidance service.

In addition, the controller 740 may transmit the state of operation of the mobile robot 1 or the user input to the server or the like via the communicator 790.

The communicator 790 may include at least one communication module, and may enable the mobile robot 1 to be connected to the Internet or another designated network therethrough.

Meanwhile, the storage 730 may store data for voice recognition, and the controller 740 may process the user-input voice signal received through the voice input interface 725, and may perform a voice recognition process.

Meanwhile, the controller 740 may control the mobile robot 1 to perform a predetermined operation based on the voice recognition result.

For example, in the case in which a command included in the voice signal is a command for requesting predetermined information, such as airplane departure information or tour guidance information, the controller 740 may perform control such that the predetermined information, such as airplane departure information or tour guidance information, is displayed on a display 710.

In addition, when the user requests guidance, the controller 740 may perform control such that the user is escorted to the destination selected by the user.

Meanwhile, the voice recognition process may not be performed by the mobile robot 1, but may be performed by the server.

In this case, the controller 740 may control the communicator 790 such that the user-input voice signal is transmitted to the server, and may receive the result of recognition of the voice signal from the server via the communicator 790.

Alternatively, simple voice recognition, such as the recognition of a hailing command, may be performed by the mobile robot 1, and complicated voice recognition, such as the processing of a natural language, may be performed by the server.

Meanwhile, the mobile robot 1 may include a display 710 for displaying predetermined information as an image and a sound output interface 780 for outputting predetermined information in the form of a sound.

The display 710 may display information corresponding to a user-input request, a processing result corresponding to the user-input request, an operation mode, an operating state, an error state, etc. as images.

As described above with reference to FIGS. 1 to 6, the display 710 may include the head display 312 and the body display 21. Since the body display 21 is realized so as to have a larger screen than the head display 312, it may be more preferable to display information on the large screen of the body display 21.

Further, the sound output interface 780 may output an announcement message, such as a warning sound, an operation mode, an operating state, or an error state, information corresponding to a user-input request, a processing result corresponding to the user-input request, etc. in the form of a sound under the control of the controller 740. The sound output interface 780 may convert an electrical signal from the controller 740 into an audio signal, and may output the audio signal. To this end, a speaker or the like may be provided.

Meanwhile, the mobile robot 1 may include an image acquisition part 720 for photographing a predetermined range.

The image acquisition part 720, which photographs the surroundings of the mobile robot 1, the external environment, etc., may include a camera module. A plurality of cameras may be installed in respective regions in order to improve photographing efficiency.

For example, as described above with reference to FIGS. 1 to 6, the image acquisition part 720 may include a head camera 313 for recognizing a person and an object and a body camera 25 for identifying and tracking a guidance target. However, the number, arrangement, type, and photographing range of cameras included in the image acquisition part 720 are not limited thereto.

The image acquisition part 720 may capture an image for user recognition. The controller 740 may determine the external situation or recognize a user (a guidance target) based on the image captured and acquired by the image acquisition part 720.

Further, the controller 740 may perform control such that the mobile robot 1 travels based on the image captured and acquired by the image acquisition part 720.

Meanwhile, the image captured and acquired by the image acquisition part 720 may be stored in the storage 730.

Meanwhile, the mobile robot 1 may include a driver 760 for the movement thereof. The driver 760 may correspond to the driver 11 described above with reference to FIGS. 1 to 6.

In addition, the mobile robot 1 may include a sensor unit 770 including sensors for sensing various kinds of data related to the operation and state of the mobile robot 1.

The sensor unit 770 may include an obstacle sensor for sensing an obstacle. The obstacle sensor may include an infrared sensor, an ultrasonic sensor, an RF sensor, a geomagnetic sensor, a position sensitive device (PSD) sensor, or the like. For example, the obstacle sensor may correspond to the ultrasonic sensor 333 and the RGBD sensor 321, described above with reference to FIGS. 1 to 6.

In addition, the sensor unit 770 may further include a cliff sensor 113 for sensing whether a cliff is present in the floor within the traveling range of the mobile robot 1.

In addition, the sensor unit 770 may include light detection and ranging (lidar) devices 136 and 118.

The lidar devices 136 and 118 may detect an object, such as an obstacle, based on time of flight (TOF) of a transmission signal and a reception signal or the phase difference between the transmission signal and the reception signal using a laser beam.

Further, the lidar devices 136 and 118 may detect the distance to the object, the speed relative to the object, and the position of the object.

The lidar devices 136 and 118 may be provided as some of the components constituting the obstacle sensor. Further, the lidar devices 136 and 118 may be provided as sensors for creating a map.

Meanwhile, the obstacle sensor senses an object, particularly an obstacle, present in the direction in which the mobile robot travels (moves), and transmits information about the obstacle to the controller 740. In this case, the controller 740 may control the motion of the mobile robot 1 depending on the position of the sensed obstacle.

Meanwhile, the sensor unit 770 may further include an operation sensor for sensing the operation of the mobile robot 1 based on the driving of the main body 101 and outputting information about the operation of the mobile robot 1. For example, a gyro sensor, a wheel sensor, or an acceleration sensor may be used as the operation sensor.

The gyro sensor senses a rotating direction and detects a rotating angle when the mobile robot 1 moves according to an operation mode. The gyro sensor detects the angular speed of the mobile robot 1 and outputs a voltage value proportional to the angular speed. The controller 740 calculates the rotating direction and the rotating angle using the voltage value output from the gyro sensor.

The wheel sensor is connected to each of the left wheel and the right wheel to sense the number of rotations thereof. Here, the wheel sensor may be a rotary encoder. The rotary encoder senses and outputs the number of rotations of each of the left wheel and the right wheel.

The controller 740 may calculate the rotating speed of each of the left wheel and the right wheel using the number of rotations thereof. In addition, the controller 740 may calculate the rotating angle using the difference in the number of rotations between the left wheel and the right wheel.

The acceleration sensor senses a change in the speed of the mobile robot 1, e.g. a change of the mobile robot 1 due to starting, stopping, a change in the direction thereof, or a collision thereof with an object. The acceleration sensor may be attached to a position adjacent to the main wheel or the auxiliary wheel to detect slippage or idling of the wheel.

Further, the acceleration sensor may be mounted in the controller 740 to sense a change in the speed of the mobile robot 1. That is, the acceleration sensor detects a magnitude of force applied thereto due to a change in the speed of the mobile robot 1 and outputs a voltage value corresponding thereto. Consequently, the acceleration sensor may function as an electronic bumper.

The controller 740 may calculate a change in the position of the mobile robot 1 based on the operation information output from the operation sensor. The position is a relative position, which is associated with an absolute position using the image information. The performance of position recognition by the mobile robot using the image information and the obstacle information may be improved through such relative position recognition.

Figure 8:
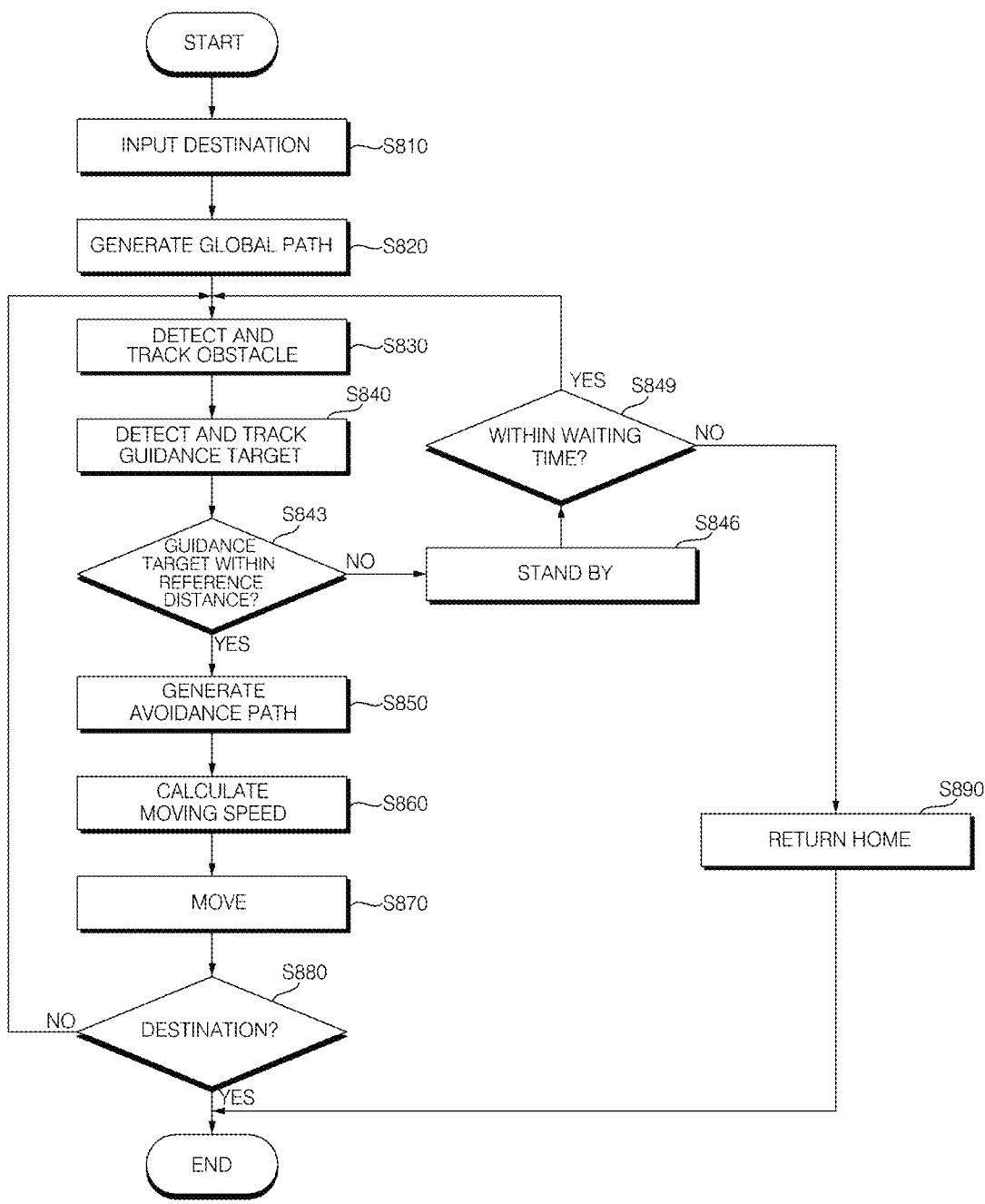
FIG. 8 is a flowchart illustrating a method of operating the mobile robot according to an embodiment of the present disclosure.

FIG. 8 is a flowchart illustrating a method of operating the mobile robot according to an embodiment of the present disclosure, and FIGS. 9 to 16 are reference diagrams for explaining the method of operating the mobile robot according to the embodiment of the present disclosure.

Referring to FIG. 8, the mobile robot 1 may receive a guidance destination input through a voice command or a touch input (S810), and may generate a global path to the received guidance destination (S820).

Figure 9:
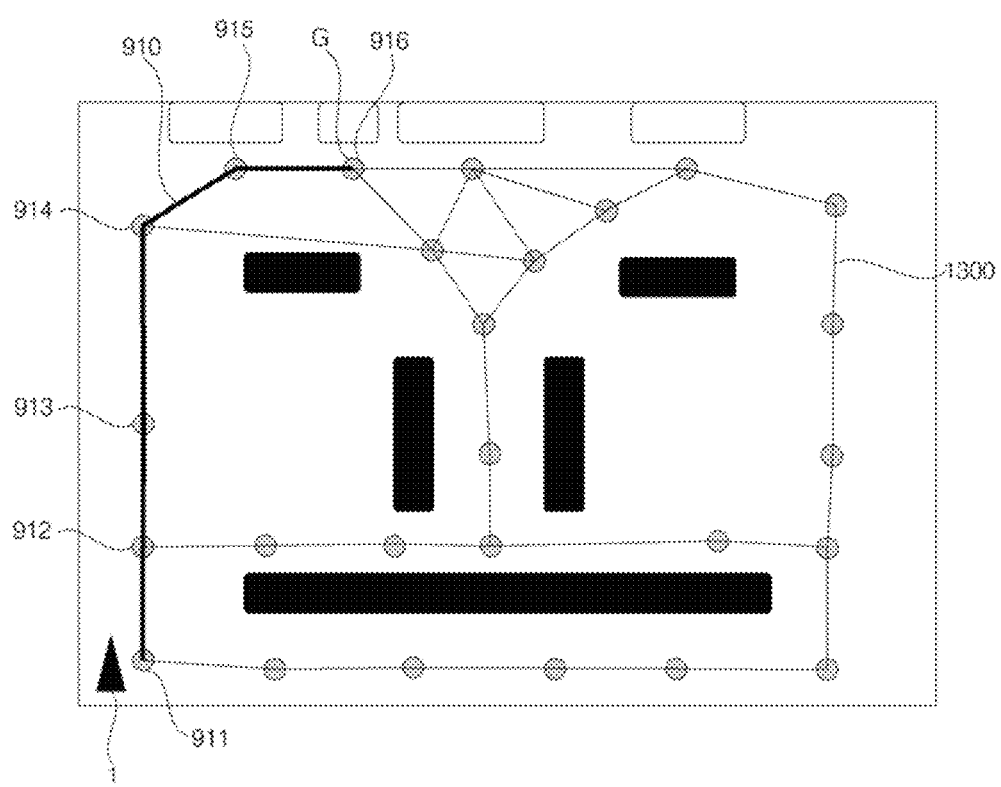
FIGS. 9 to 16 are reference diagrams for explaining the method of operating the mobile robot according to the embodiment of the present disclosure.

When the user requests guidance to a predetermined destination G through voice or touch input, as shown in FIG. 9, the controller 740 may generate a global path 910 connected from a node 911 corresponding to the current position of the mobile robot 1 to a destination node 916 corresponding to the destination G.

The global path 910 may be formed by a plurality of nodes 911, 912, 913, 914, 915 and 916 that are sequentially disposed.

Meanwhile, in this specification, the global path may be a plurality of nodes set from the current position of the mobile robot 1 to the guidance destination and the connection relationships among the plurality of nodes, and the local path may be a path from any one node to a specific node among the plurality of nodes included in the global path.

In addition, the avoidance path may be a path for avoiding collision with a detected obstacle, and may be generated based on a local path. When a local path is generated in consideration of detected obstacles, the local path and the avoidance path may be the same.

The plurality of nodes may include a destination node corresponding to a preset guidance destination and a general node for forming a path to the guidance destination. In the case of, for example, an airport, a destination to which the user may request guidance, e.g. a boarding gate, a duty-free shop, a restroom, or the like, may be set to be a destination node, and general nodes that may be included in the guidance path to the destination node may be set.

Meanwhile, the controller 740 may generate the global path 910 connected from the node 911 corresponding to the current position of the mobile robot 1 to the destination node 916 corresponding to the destination G based on the generated topological map.

According to an embodiment of the present disclosure, the coordinates of the plurality of nodes set in a grid map, such as a simultaneous localization and mapping (SLAM) map and a CAD map, may be extracted, and edges among the nodes, the distance between which falls within a predetermined range, may be generated (registered). The topological map may be generated by connecting all nodes to each other through repetition of a process of generating (registering) edges among the nodes, the distance between which falls within a predetermined range.

Accordingly, it is not necessary to load the entire grid map, thereby speeding up data processing and global path generation.

Meanwhile, after generating the topological map, the controller 740 may divide the grid map into division maps having predetermined sizes, and may divide the topological map into division maps having predetermined sizes.

Thereafter, when the guidance service is provided, the local path and the avoidance path may be generated more rapidly using the division maps.

Meanwhile, the mobile robot 1 may detect and track an obstacle through the sensor unit 770 (S830).

The sensor unit 770 may include an obstacle sensor for detecting an obstacle, and the obstacle sensor may include an infrared sensor, an ultrasonic sensor, an RF sensor, a geomagnetic sensor, a position sensitive device (PSD) sensor, or the like. For example, the obstacle sensor may correspond to the ultrasonic sensor 333, the RGBD sensor 321, and the lidar devices 136 and 118 described above with reference to FIGS. 1 to 6.

Meanwhile, the detection and tracking of the obstacle (S830) may be performed at all times during the operation of the mobile robot 1, regardless of provision of the guidance service, or may be performed prior to movement thereof, such as provision of the guidance service or returning to a home.

In addition, the mobile robot 1 may detect and track a guidance target (S840).

The controller 740 may identify a guidance target based on the image acquired by the image acquisition part 720. For example, the image acquisition part 720 may include a body camera part 25 for identifying and tracking a guidance target, and the controller 740 may recognize persons in the image captured by the body camera part 25 to identify the guidance target.

The body camera part 25 may be configured as a 3D sensor, such as an RGBD camera sensor, and may sense whether a guidance target is present, the distance between the guidance target and the mobile robot 1, and the speed of the guidance target in a guidance mode.

In another embodiment, the mobile robot 1 may not include the body camera part 25, but may further include a sensor provided at any other region thereof for identifying and tracking a guidance target.

When a plurality of persons is included in the image acquired by the image acquisition part 720, the controller 740 may determine the person present at the position closest to the center of the image to be the guidance target.

When discriminating between an obstacle and a guidance target and identifying a guidance target among persons, the controller 740 may determine a person who is present close to the center of the mobile robot 1 to be the guidance target.

Meanwhile, the detection and tracking of an obstacle (S830) and the detection and tracking of a guidance target (S840) may not be performed sequentially, but may be performed simultaneously.

For example, before or after the generation of the global path, the controller 740 may control the sensor unit 770 and the body camera part 25 to detect an obstacle and a guidance target, respectively.

Further, when generating the global path, the controller 740 may discriminate between an obstacle and a guidance target through processing and fusion of data sensed by the sensor unit 770 and the body camera part 25.

Meanwhile, the controller 740 may recognize persons detected by the 3D sensor of the body camera part 25 among the information about obstacles detected and tracked by the sensor unit 770, such as lidar devices 136 and 118, and may separately identify and track a guidance target.

Further, the controller 740 may monitor the sensing data of the sensor unit 770 and the body camera part 25 to control the mobile robot 1 to travel while maintaining a predetermined distance from the guidance target.

Further, the controller 740 may control the mobile robot 1 to travel at a speed suitable for guidance to the destination based on the surrounding environment information and the guidance target information detected by the sensor unit 770 and the body camera part 25.

In the state in which the mobile robot 1 is stationary or is moving, when the guidance target is detected to be present within a reference distance (S843), the controller 740 may generate an avoidance path for avoiding an obstacle being tracked (S850).

In addition, the controller 740 may calculate a moving speed of the mobile robot 1 based on the distance between the obstacle being tracked and the guidance target (S860), and may control the mobile robot 1 to move based on the avoidance path and the calculated moving speed (S870).

Meanwhile, the controller 740 may extract a node (a next target node) to which the mobile robot 1 is to move next, among the plurality of nodes included in the global path.

The controller 740 may load, among the division maps of the grid map, a division map corresponding to a path to the next target node included in the global path, and may generate an avoidance path to the next target node based on the loaded division maps (S850).

In this case, the controller 740 may control the mobile robot 1 to move to the next target node based on the local path to the next target node (S870).

Meanwhile, after the movement of the mobile robot 1 (S870), the controller 740 may determine whether the mobile robot 1 has arrived at the destination (S880).

When the current position of the mobile robot 1 does not correspond to the destination node (S880), the controller 740 may create one more next target node and may set the same as a new next target node.

In addition, the controller 740 may generate an avoidance path to the next target node based on the loaded division map (S850), and may control the mobile robot to move to the next target node based on the local path (S870).

That is, the controller 740 may repeat the above process until the mobile robot reaches the destination.

Meanwhile, the controller 740 may control the display 710 and/or the sound output interface 780 to output guidance information during movement of the mobile robot.

As described above with reference to FIGS. 1 to 6, the display 710 may include the head display 312 and the body display 21. Since the body display 21 is realized so as to have a larger screen than the head display 312, it may be more preferable to display information on the large screen of the body display 21.

In addition, during movement of the mobile robot, the body display 21 is oriented toward the rear side of the mobile robot 1 that the guidance target follows, and thus it is more preferable to display the guidance information on the body display 21.

Figure 10:
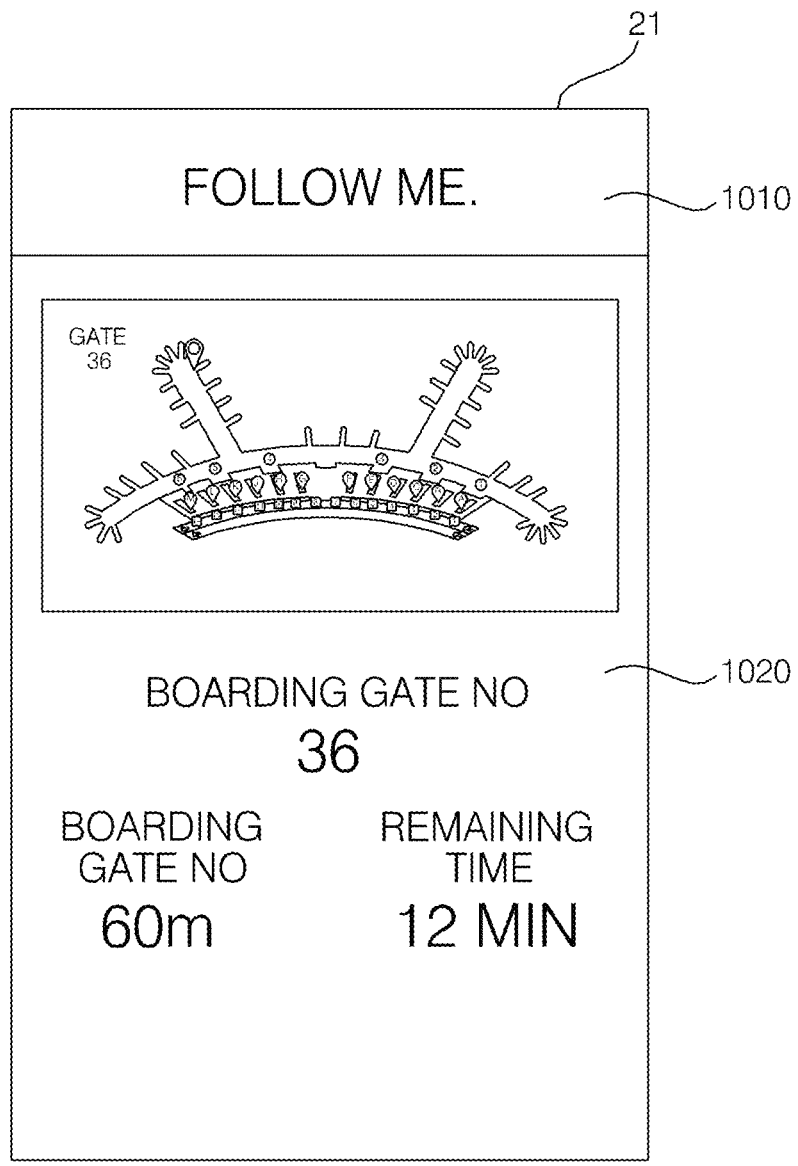

Referring to FIG. 10, a guidance message 1010, such as "Follow me", navigation information including a destination and a map screen, and guidance information 1020, such as a remaining distance and a remaining time, may be displayed on the body display 21.

In addition, the sound output interface 780 may output a guidance message, such as "Follow me", in the form of a sound when the guidance is started. In addition, the sound output interface 780 may output driving information, such as rotation, in the form of a sound.

Meanwhile, when no guidance target is detected to be present within the reference distance (S843), the controller 740 may perform control such that a standby mode is switched on (S846).

Here, the standby mode may be a mode in which the mobile robot waits for return of the guidance target for a preset waiting time, and may maintain a stationary state until the guidance target is redetected within the preset waiting time.

That is, when the guidance target disappears from the recognition range, the mobile robot 1, which is moving, may temporarily stop moving and stand by. When the mobile robot 1 has not started moving, the mobile robot 1 may not start moving, but may stand by.

Meanwhile, upon detecting the guidance target within a preset waiting time (S849), the controller 740 may perform control such that the process goes back to the step S830 of detecting and tracking an obstacle.

In this case, the mobile robot 1 detects again an obstacle and a guidance target (S830 and S840), generates an avoidance path (S850), calculates a moving speed of the mobile robot (S860), and moves (S870).

Meanwhile, when the guidance target is not detected within the preset waiting time (S849), the controller 740 may return to a preset home (S890). That is, when the waiting time elapses without detection of a guidance target, the mobile robot 1 may return to the home.

Here, the home may be a place in which a charging stand is disposed or another preset place.

Meanwhile, obstacle avoidance may be the most important factor in calculating and changing the moving speed of the mobile robot. Since collision of the mobile robot with a moving obstacle such as a person in a public place leads to an accident, collision with an obstacle needs to be prevented first and foremost in the interest of safety. Further, the speed of the mobile robot 1 needs to be controlled so as to temporarily stop moving or otherwise avoid a collision when an obstacle suddenly appears during movement of the mobile robot 1.

Therefore, the controller 740 may set the avoidance path and the moving speed of the mobile robot by preferentially considering the obstacle being tracked.

Further, the controller 740 may set the moving speed of the mobile robot so as to maintain the distance to the guidance target within a predetermined range.

Meanwhile, the reference distance may be set in consideration of the detection performance of the body camera part 25. For example, the reference distance may be set to 5 m.

Figure 11:
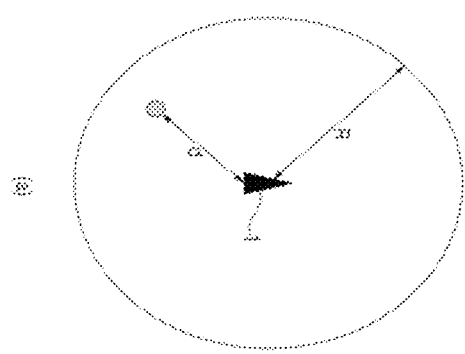
Figure 11:
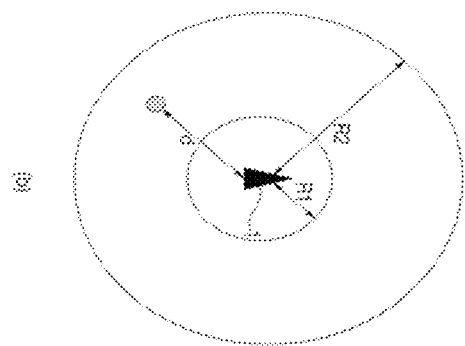

FIG. 11 is a diagram illustrating examples of setting the reference distance.

Referring to FIG. 11(*a*), the reference distance R may be set to an allowable maximum value of the distance d between the guidance target and the mobile robot 1.

When the guidance target is detected within the reference distance R, the controller 740 may control the mobile robot to travel at a speed and along a path suitable for the path guidance service.

Meanwhile, when the reference distance R is set to be the recognition range of the guidance target recognition sensor, e.g. the body camera part 25, if the guidance target is out of the reference distance R, the sensor unit 770, such as the lidar, recognizes the guidance target as a moving obstacle and does not recognize the same as a guidance target.

Further, when the reference distance R is set to be smaller than the recognition range of the guidance target recognition sensor, even if the guidance target is detected to move beyond the reference distance R, the guidance target may ignore the mobile robot 1 and may independently move to another place.

In this case, the mobile robot may wait for the return of a guidance target that has moved beyond the reference distance R. When the guidance target returns and is again located within the reference distance R, the mobile robot may continue guidance, but when the guidance target does not return, the mobile robot may terminate guidance and may return to the home.

That is, when the guidance target is not detected within the reference distance R, the controller 740 waits for redetection of the guidance target for a predetermined waiting time. When the controller 740 fails to detect the guidance target, the controller 740 may control the mobile robot to terminate guidance and to return to the home.

Referring to FIG. 11(*b*), the reference distance may be set to have an upper limit reference value R2 and a lower limit reference value R1. That is, the reference range may be set between the upper limit reference value R2 and the lower limit reference value R1 to sense the distance to the guidance target.

In this case, when the guidance target is detected within the reference range between the upper limit reference value R2 and the lower limit reference value R1, the mobile robot may continue the guidance service. Otherwise, the mobile robot may stand by for a predetermined waiting time, and thereafter, may return to the home. Here, the upper limit reference value R2 may be set in consideration of the detection performance of the body camera part 25.

According to an embodiment of the present disclosure, the speed of the mobile robot 1 may be varied during movement of the mobile robot 1. During movement, the mobile robot 1 may perform avoidance driving in order to prevent collision with all of the obstacles detected within a preset distance.

Further, excessively close approach of the guidance target to the mobile robot 1 may cause a safety risk. Therefore, it may be possible to prevent excessively close approach of the guidance target by setting a predetermined safety range. For example, when the guidance target approaches within the lower limit reference value R1, the mobile robot may temporarily stop moving and may request the guidance target to adjust the speed of the guidance target.

In some embodiments, when the gaze movement of the guidance target is detected a predetermined number of times or more, the controller 740 may perform control such that a message inquiring whether to terminate guidance is output.

When the gaze movement of the guidance target is repeatedly detected, it can be considered that the guidance target is interested in a place other than the destination and is likely to move to another place away from the guidance path.

Thus, the controller 740 may output a message inquiring whether to terminate guidance, and may terminate guidance depending on the user input.

Further, when the guidance target moves slowly while turning the head thereof, it can be considered that the guidance target is likely to move away from the path.

Therefore, when the guidance target looks at another place, moves slowly, or changes a direction, the controller 740 may output a message indicating termination of guidance, or may output a message inquiring whether to terminate guidance or whether to stand by.

Meanwhile, when the mobile robot 1 accompanies a person to the destination, it is preferable for the mobile robot 1 to move while maintaining a predetermined distance from the guidance target.

Thus, the controller 740 may control the mobile robot to change the moving speed thereof in accordance with the moving speed of the guidance target.

When calculating the moving speed of the mobile robot, the controller 740 may set the limit value of the moving speed of the mobile robot based on the speed of the person.

Further, the controller 740 may set the moving speed of the mobile robot differently depending on the age and gender of the recognized guidance target.

For example, when the recognized guidance target is an elderly person, the controller 740 may control the mobile robot to move slowly, and when both an adult and a child are detected together, the controller 740 may calculate the moving speed of the mobile robot on the basis of the speed of the child. Further, when the guidance target carries a carrier or a luggage, the controller 740 may reduce the moving speed of the mobile robot.

Further, when the guidance target approaches the mobile robot during guidance, the controller 740 may increase the moving speed of the mobile robot 1.

Furthermore, when the guidance target moves away from the mobile robot during guidance, the controller 740 may reduce the moving speed of the mobile robot 1.

According to an embodiment of the present disclosure, a guidance target and an obstacle may be detected through fusion of data sensed by the lidar sensors 136 and 118 and the 3D sensor 25, and the controller 740 may control the speed of the mobile robot through detection of the state (distance and speed) of the guidance target and a change in the surrounding environment.

Since an object is detected and tracked through fusion of the lidar sensors 136 and 118 and the 3D sensor 25, a guidance target and an obstacle to be avoided may be reliably distinguished, and the mobile robot 1 may travel at a speed suitable for guiding a person to a destination.

That is, it is possible to control the mobile robot to move at an appropriate guiding speed through guidance target detection and tracking information.

Further, in the case in which a destination may be changed during guidance, the controller 740 may control the mobile robot to change the speed thereof when the destination is changed.

Meanwhile, the mobile robot 1 according to an embodiment of the present disclosure may stand by without moving when a guidance target moves out of the recognition range. When failing to redetect the guidance target for a predetermined waiting time, the mobile robot 1 may return to the home.

Meanwhile, when the moving speed of the guidance target is higher than the moving speed of the mobile robot 1, the controller 740 may control the display 710 and/or the sound output interface 780 to output a predetermined guidance message. In this case, the guidance message may be output differently depending on the difference between the moving speed of the guidance target and the moving speed of the mobile robot.

In contrast, when the moving speed of the guidance target is lower than the moving speed of the mobile robot 1, the controller 740 may also control the display 710 and/or the sound output interface 780 to output a predetermined guidance message.

Figure 12:
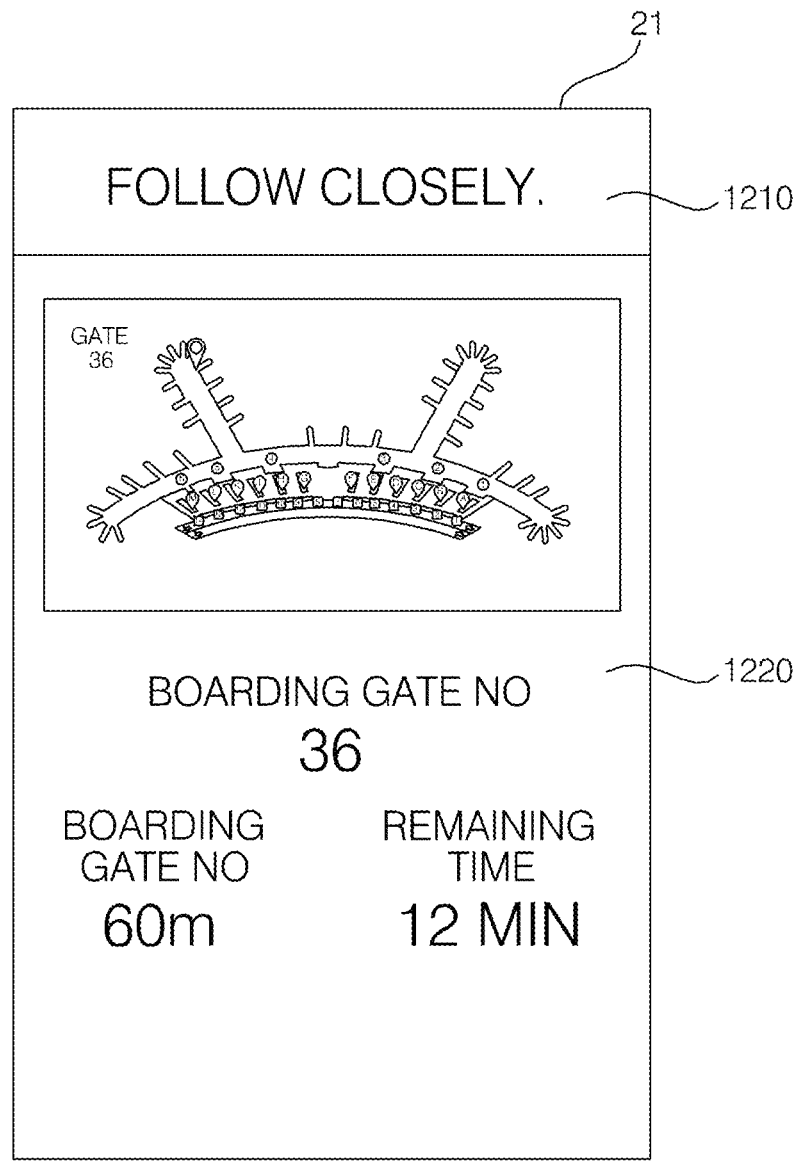

Referring to FIG. 12, when the moving speed of the guidance target becomes lower than the moving speed of the mobile robot 1 during guidance and thus the distance between the guidance target and the mobile robot 1 increases, the controller 740 may control the body display 21 to display a guidance message 1210, such as "Follow closely", thereon.

In addition, the sound output interface 780 may output a voice guidance message, such as "Follow closely", in the form of a sound under the control of the controller 740.

Meanwhile, the body display 21 may display navigation information including a destination and a map screen, and guidance information 1220, such as a remaining distance and a remaining time, thereon.

Figure 13:
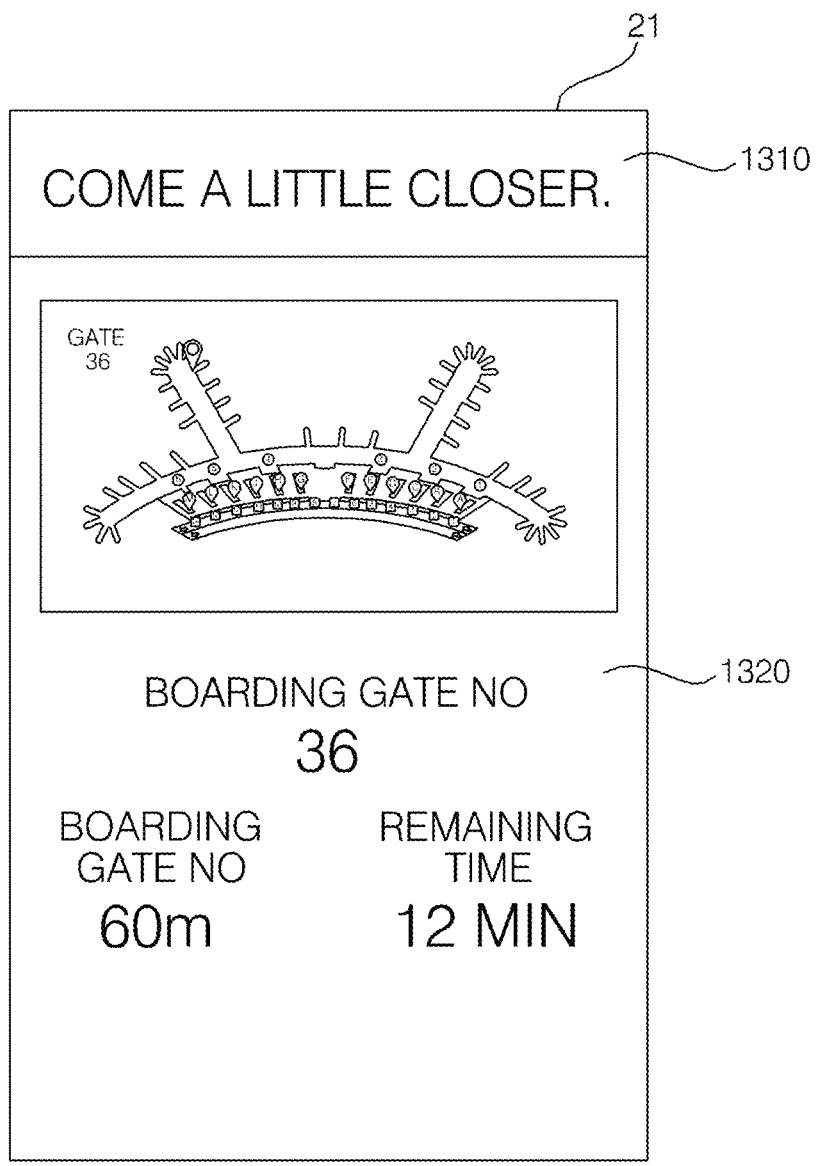

Referring to FIG. 13, when the moving speed of the guidance target becomes lower than the moving speed of the mobile robot 1 during guidance and thus the distance between the guidance target and the mobile robot 1 increases, the controller 740 may control the body display 21 to display a guidance message 1310, such as "Come a little closer", thereon.

In addition, the sound output interface 780 may output a voice guidance message, such as "Come a little closer", in the form of a sound under the control of the controller 740.

Meanwhile, the body display 21 may display navigation information including a destination and a map screen, and guidance information 1320, such as a remaining distance and a remaining time, thereon.

Meanwhile, the guidance message may be output differently depending on the difference between the moving speed of the guidance target and the moving speed of the mobile robot.

For example, when the difference between the moving speed of the guidance target and the moving speed of the mobile robot is greater than or equal to a predetermined value, the guidance message 1210, such as "Follow closely", may be output, as shown in FIG. 12, and when the speed difference is less than the predetermined value, the guidance message 1310, such as "Come a little closer", may be output, as shown in FIG. 13.

Further, the guidance messages 1210 and 1310 may be sequentially output.

For example, when the difference between the moving speed of the guidance target and the moving speed of the mobile robot increases, as shown in FIG. 12, the guidance message 1210, such as "Follow closely", may be first output, and when the speed difference starts to decrease, as shown in FIG. 13, the guidance message 1310, such as "Come a little closer", may be output.

Meanwhile, when the distance to the guidance target exceeds the reference distance, the mobile robot 1 according to the present disclosure may terminate guidance, and may provide a guidance message related thereto to the guidance target.

Figure 14:
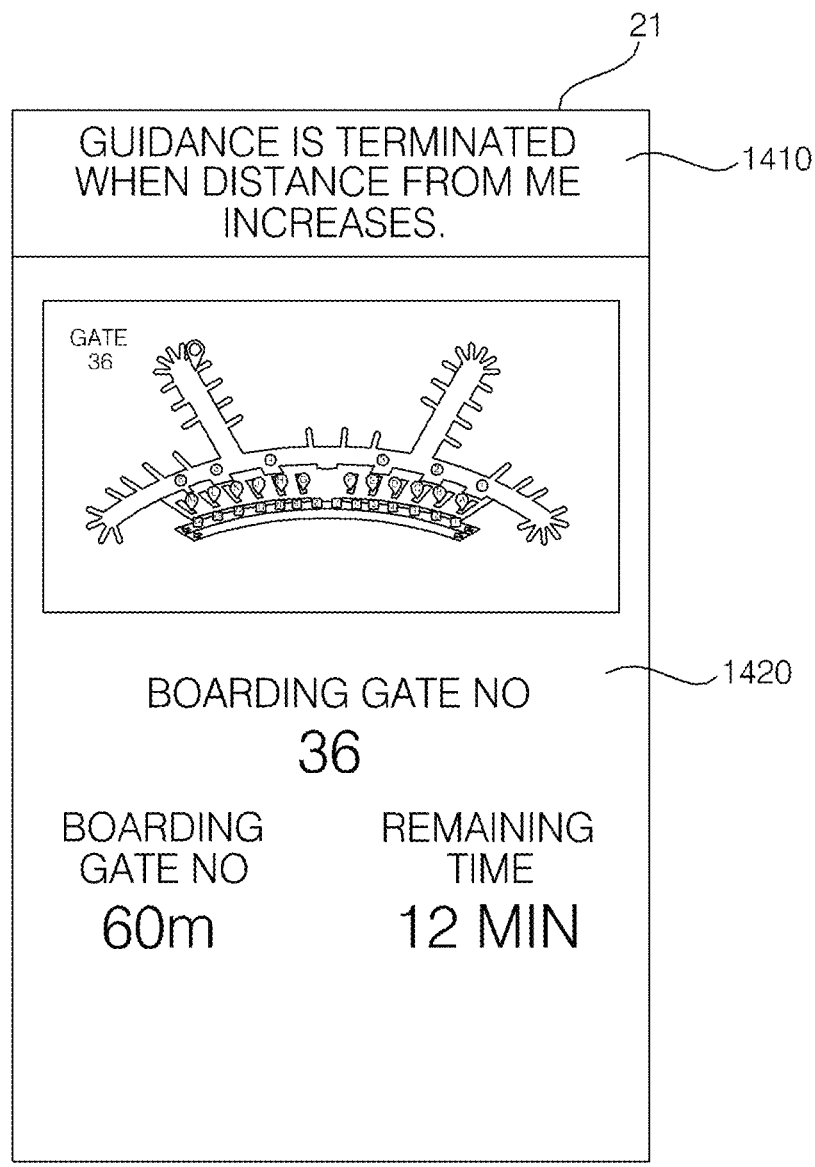

Referring to FIG. 14, during guidance, the body display 21 may display a guidance message 1410, such as "Guidance is terminated when distance from me increases", thereon, and the sound output interface 780 may output the voice guidance message in the form of a sound under the control of the controller 740.

Meanwhile, the body display 21 may display navigation information including a destination and a map screen, and guidance information 1420, such as a remaining distance and a remaining time, thereon.

Figure 15:
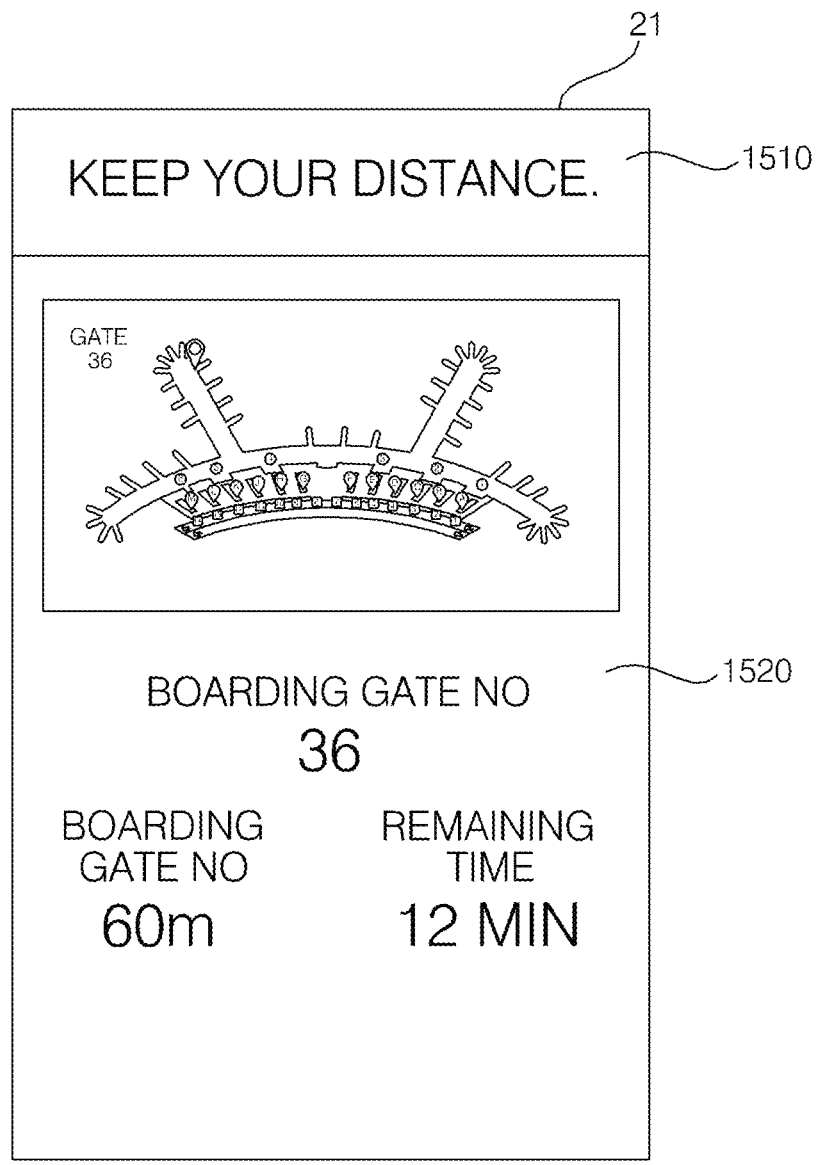

Referring to FIG. 15, during guidance, when the moving speed of the guidance target exceeds the moving speed of the mobile robot 1 and thus the distance between the guidance target and the mobile robot 1 decreases, the controller 740 may perform control such that the body display 21 displays a guidance message 1510, such as "Keep your distance", thereon and such that the sound output interface 780 outputs the voice guidance message in the form of a sound.

In this case, the body display 21 may also display navigation information including a destination and a map screen, and guidance information 1520, such as a remaining distance and a remaining time, thereon.

In some embodiments, when the gaze movement of the guidance target is detected a predetermined number of times or more, or when the guidance target looks at another place, moves slowly, or changes a direction, the controller 740 may output a message indicating termination of guidance, or may output a message inquiring whether to terminate guidance or whether to stand by.

Figure 16:
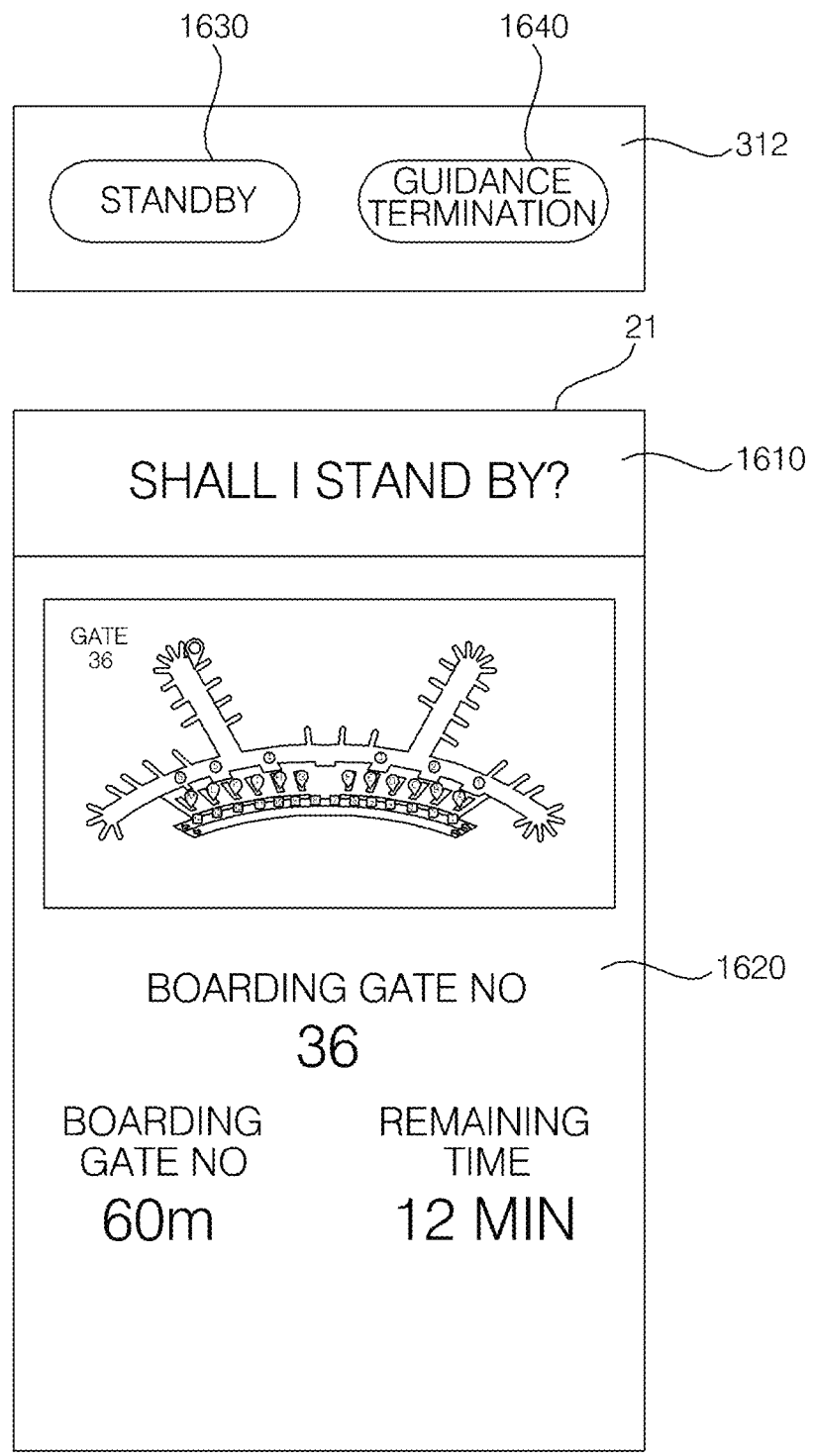

Referring to FIG. 16, a guidance message 1610, such as "Shall I stand by?", navigation information including a destination and a map screen, and guidance information 1620, such as a remaining distance and a remaining time, may be displayed on the body display 21.

In this case, the head display 312 may display thereon menu items 1630 and 1640 on which the user may select standby or guidance termination.

The guidance target may touch the menu items 1630 and 1640, or may input a voice command to select standby or guidance termination.

Further, when there is no input for a predetermined amount of time in the state in which the above guidance message 1610 is displayed, the controller 740 may control the mobile robot to terminate guidance and to return to the home.

The mobile robot 1 according to the present disclosure may generate an avoidance path with respect to a moving/stationary obstacle using person recognition and tracking technology.

In addition, the mobile robot 1 according to the present disclosure may travel while maintaining a predetermined distance from the guidance target, and may return to the home when failing to detect the guidance target.

According to at least one of embodiments of the present disclosure, various kinds of services, such as guidance service, may be provided in a public place.

In addition, according to at least one of embodiments of the present disclosure, a guidance target may be comfortably escorted to a destination in consideration of the position and the speed of the guidance target.

In addition, according to at least one of embodiments of the present disclosure, an optimum and safe guidance path may be generated when guidance service is provided.

In addition, according to at least one of embodiments of the present disclosure, information displayed on a display may be easily provided while a service such as path guidance is provided.

The mobile robot according to the present disclosure is not limited to the configurations and methods of the above-described embodiments, and all or some of the embodiments may be selectively combined to obtain various modifications.

Meanwhile, the method of operating a mobile robot according to an embodiment of the present disclosure may be implemented as code that can be written on a processor-readable recording medium and thus read by a processor. The processor-readable recording medium may be any type of recording device in which data is stored in a processor-readable manner. The processor-readable recording medium may include, for example, ROM, RAM, CD-ROM, a magnetic tape, a floppy disk, and an optical data storage device, and may be implemented in the form of a carrier wave transmitted over the Internet. In addition, the processor-readable recording medium may be distributed over computer systems connected via a network such that processor-readable code is written thereto and executed therefrom in a decentralized manner.

In addition, it will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

The invention claimed is:

1. A method of operating a mobile robot, the method comprising:
   receiving a guidance destination input;
   generating a global path to the received guidance destination;
   detecting and tracking an obstacle;
   detecting and tracking a guidance target;
   upon detecting the guidance target within a reference distance, generating an avoidance path to avoid an obstacle being tracked;
   calculating a moving speed based on a distance to the guidance target and the obstacle being tracked, the age of the guidance target and whether or not the guidance target is carrying luggage; and
   moving based on the avoidance path and the calculated moving speed,
   wherein the detecting and tracking the guidance target comprises, when a plurality of persons are present in an image acquired by an image acquisition part, determining a person among the plurality of persons that is present at a position closest to a center of the image and closest to a main body of the mobile robot to be the guidance target.

2. The method of claim 1, wherein, when a current position after the moving is not a destination, the detecting and tracking an obstacle is performed again.

3. The method of claim 1, further comprising, when the guidance target is not detected within the reference distance:
   switching to a standby mode.

4. The method of claim 3, wherein, when the guidance target is detected within a preset waiting time, the detecting and tracking an obstacle is performed again.

5. The method of claim 3, further comprising, when the guidance target is not detected within the preset waiting time:
   traveling back to a preset home.

6. The method of claim 1, further comprising, when a moving speed of the guidance target is higher than a moving speed of a mobile robot:
   outputting a predetermined guidance message.

7. The method of claim 6, wherein the guidance message is output differently depending on a difference between the moving speed of the guidance target and the moving speed of the mobile robot.

8. The method of claim 1, further comprising:
   changing a moving speed of a mobile robot so as to correspond to a moving speed of the guidance target.

9. The method of claim 1, further comprising, when gaze movement of the guidance target is detected a predetermined number of times or more:
   outputting a message inquiring whether to terminate guidance.

10. The method of claim 1, wherein the generating an avoidance path further comprises:
    loading division maps corresponding to a path to a next target node included in the global path; and
    generating a local path to the next target node based on the loaded division maps.

11. The method of claim 10, wherein the moving comprises moving to the next target node based on an avoidance path to the next target node.

12. The method of claim 1, wherein the global path comprises a destination node corresponding to the guidance destination and a plurality of general nodes present between a current position of a mobile robot and the destination node.

13. The method of claim 1, wherein the generating a global path comprises generating the global path based on a generated topological map.

14. The method of claim 1, further comprising:
reducing the moving speed of the mobile robot when the age of the guidance target is less than a first age limit or greater than a second age limit; or
reducing the moving speed of the mobile robot when the guidance target is carrying luggage.

* * * * *